(12) United States Patent
Lanigan, Sr. et al.

(10) Patent No.: US 9,909,851 B2
(45) Date of Patent: Mar. 6, 2018

(54) AUTOMATICALLY ALIGNING CHASSIS GUIDES

(71) Applicant: Mi-Jack Products, Inc., Hazel Crest, IL (US)

(72) Inventors: John J. Lanigan, Sr., Orland Park, IL (US); Martin C. Conneally, Downers Grove, IL (US); Antonio Carlos Callado Souza, Chicago, IL (US); Jason Schmidt, Flossmoor, IL (US); Kevin Gerald Muszynski, Lockport, IL (US)

(73) Assignee: Mi-Jack Products, Inc., Hazel Crest, IL (US)

( * ) Notice: Subject to any disclaimer, the term of this patent is extended or adjusted under 35 U.S.C. 154(b) by 267 days.

(21) Appl. No.: 14/856,290

(22) Filed: Sep. 16, 2015

(65) Prior Publication Data

US 2016/0252338 A1    Sep. 1, 2016

Related U.S. Application Data

(60) Provisional application No. 62/126,198, filed on Feb. 27, 2015.

(51) Int. Cl.
| | |
|---|---|
| *G01B 5/255* | (2006.01) |
| *B61D 47/00* | (2006.01) |
| *G01B 7/00* | (2006.01) |
| *B65G 69/00* | (2006.01) |

(52) U.S. Cl.
CPC ............ *G01B 5/255* (2013.01); *B61D 47/00* (2013.01); *B65G 69/006* (2013.01); *G01B 7/003* (2013.01); *G01B 2210/22* (2013.01)

(58) Field of Classification Search
CPC ........ G01B 5/255; G01B 7/003; B61D 47/00; B65G 69/006

USPC ... 33/203.13, 203.18, 203.2, 203.21, 203.12, 33/203.14, 203.17; 73/116.08, 862.18
See application file for complete search history.

(56) References Cited

U.S. PATENT DOCUMENTS

| | | | |
|---|---|---|---|
| 3,182,405 A | * | 5/1965 | Taylor .................... G01B 5/255 33/203.18 |
| 3,191,966 A | | 6/1965 | Felburn |
| 3,460,264 A | | 8/1969 | Cluchey |
| (Continued) | | | |

OTHER PUBLICATIONS

International Search Report and Written Opinion dated May 5, 2016, for International Application No. PCT/US2016/019358, Applicant, Mi-Jack Products, Inc. (11 pages).

(Continued)

*Primary Examiner* — R. A. Smith
*Assistant Examiner* — Tania Courson
(74) *Attorney, Agent, or Firm* — McCracken & Gillen LLC

(57) ABSTRACT

A system for positioning a vehicle chassis in which tires are mounted on an axle associated with the chassis is provided. The system includes first and second tire guides spaced apart from one another in which the first and second tire guides are configured to opposedly face one another. The system further includes tire guide sections joined to form each of the first and second tire guides. Each tire guide section is adjustable within a range such that a distance between opposing tire guide sections may be adjusted. The tire guide sections are adjusted based on the position of the tires mounted on the axle associated with the chassis.

21 Claims, 19 Drawing Sheets

(56) References Cited

U.S. PATENT DOCUMENTS

| | | | |
|---|---|---|---|
| 4,341,021 A * | 7/1982 | Beissbarth | G01B 7/315 33/203.18 |
| 4,569,140 A | 2/1986 | Hobson | |
| 4,679,327 A * | 7/1987 | Fouchey | G01B 7/315 33/203.13 |
| 5,357,777 A * | 10/1994 | Castellano | B21D 1/14 33/608 |
| 5,844,145 A * | 12/1998 | D'Angelo | G01M 17/0072 73/862.17 |
| 6,473,978 B1 | 11/2002 | Maas | |
| 7,318,340 B2 * | 1/2008 | Suita | G01M 17/0074 73/116.08 |
| 7,637,021 B2 * | 12/2009 | Suita | G01M 11/067 33/203.12 |
| 2004/0107069 A1 | 6/2004 | Kidd et al. | |

OTHER PUBLICATIONS

International Preliminary Report on Patentability and Written Opinion dated Aug. 29, 2017, for International Application No. PCT/US2016/019358, Applicant, Mi-Jack Products, Inc. (6 pages).

* cited by examiner

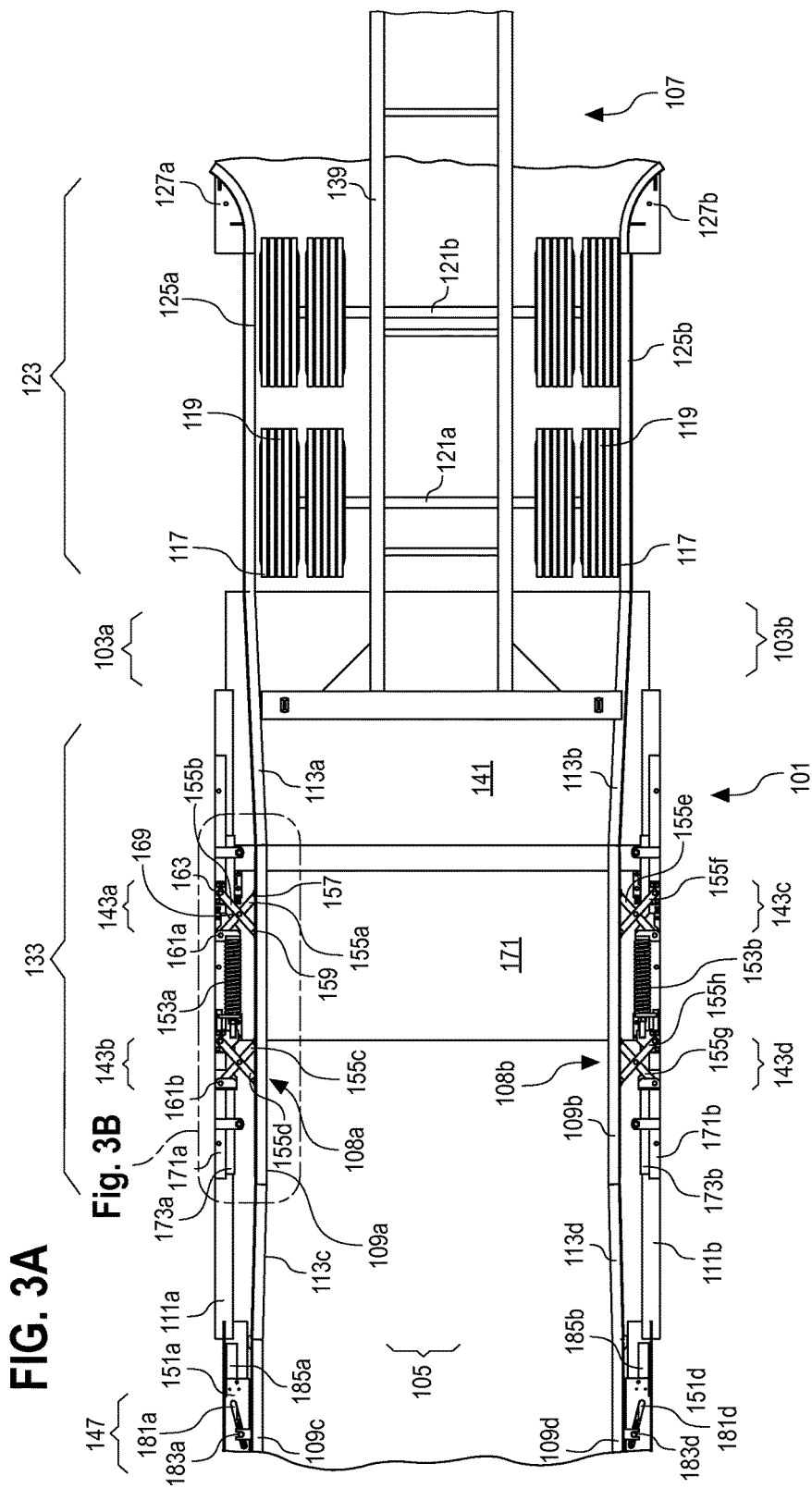

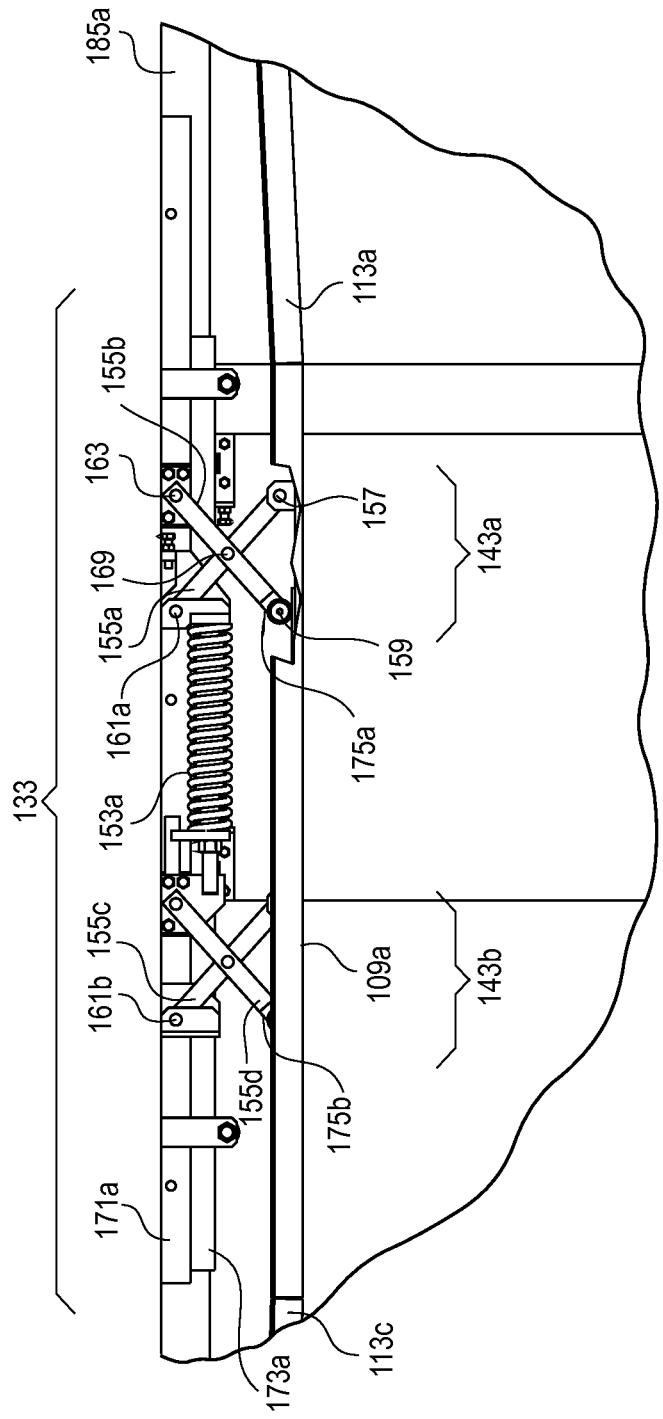

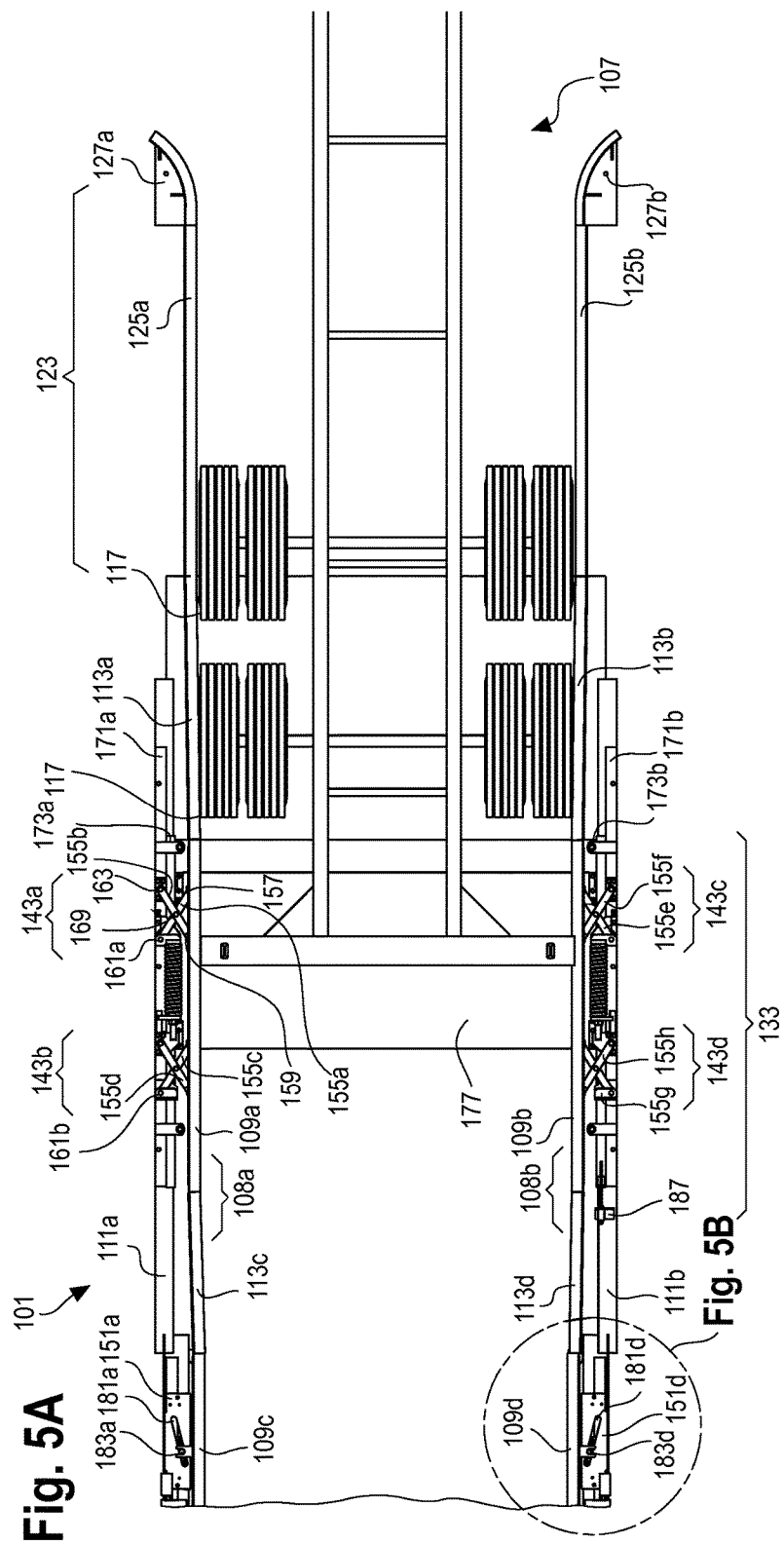
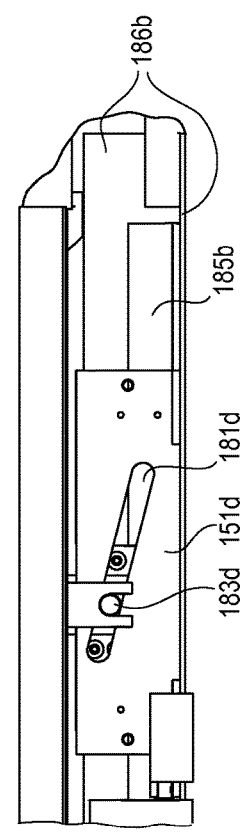
Fig. 5A
Fig. 5B

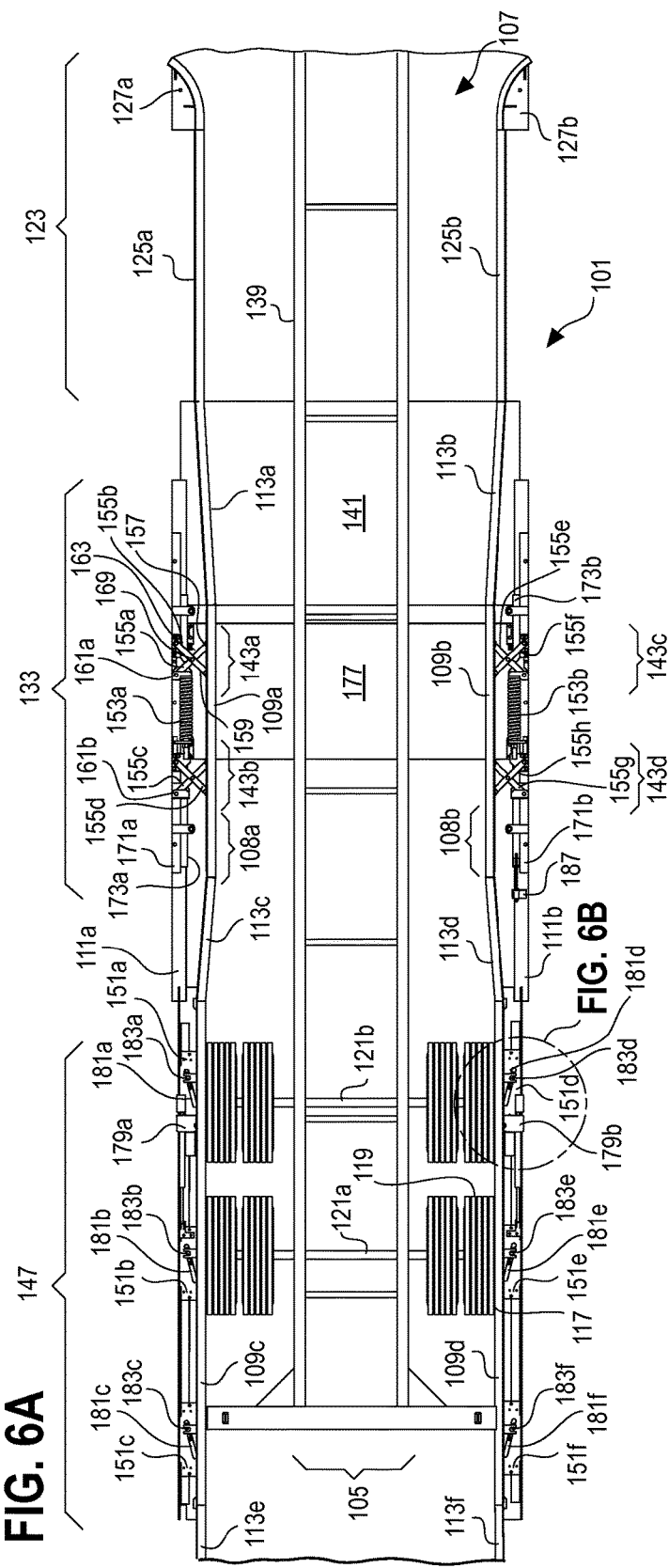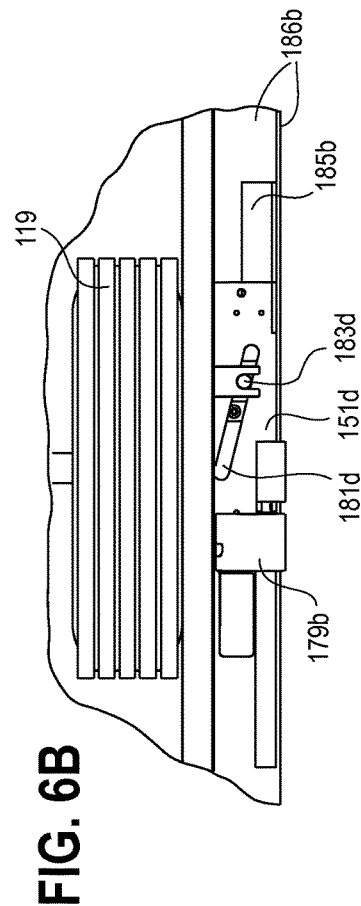

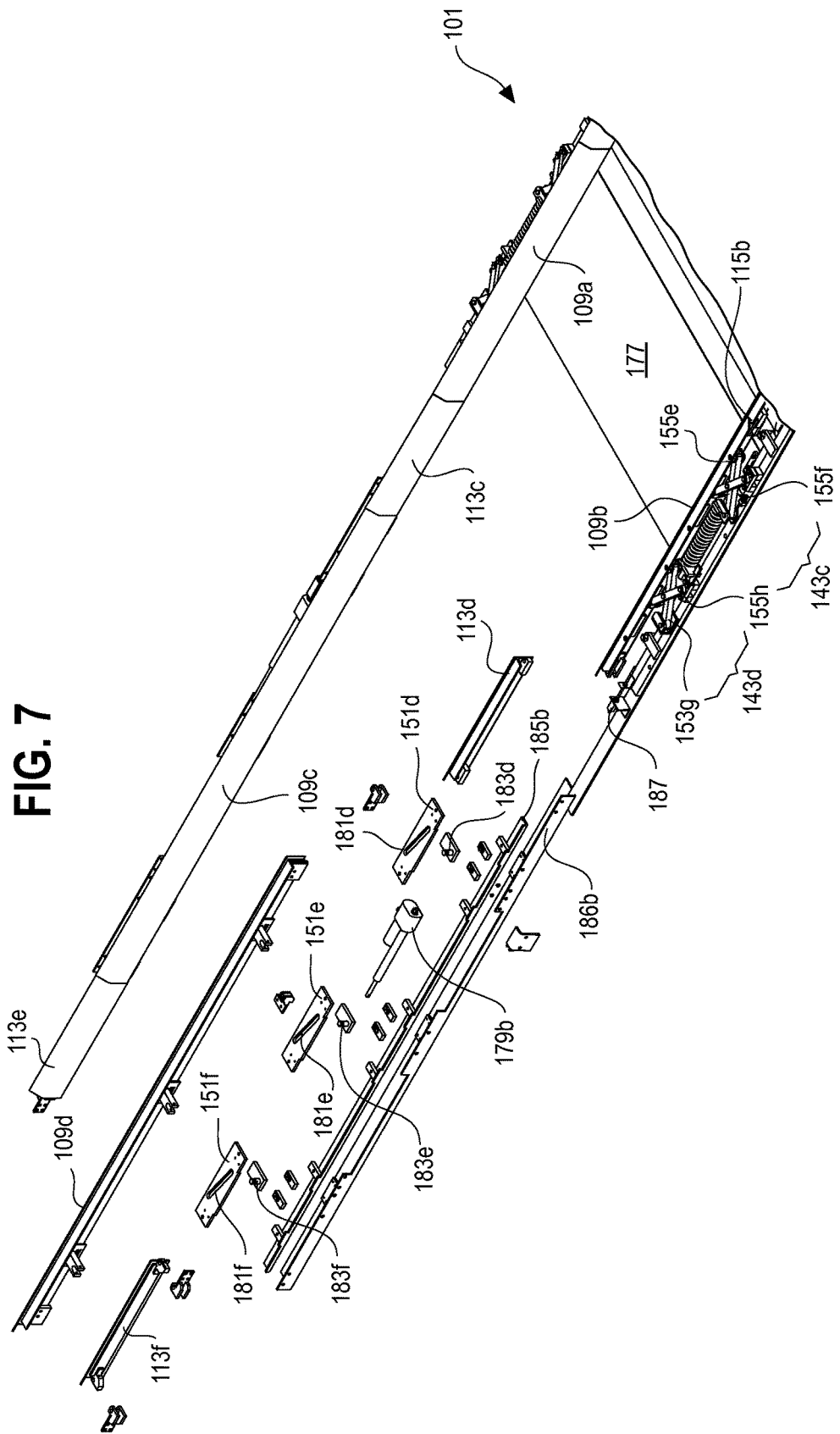

AUTOMATICALLY ALIGNING CHASSIS GUIDES

CROSS REFERENCE TO RELATED APPLICATIONS

The present application claims the benefit of Lanigan, Sr. et al., U.S. provisional patent application Ser. No. 62/126,198, filed on Feb. 27, 2015, and entitled "Intermodal Transfer Management System". The entire contents of this application are incorporated herein by reference.

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to vehicle positioning systems, and more particularly, to systems for positioning semi-trailer trucks.

BACKGROUND

The transportation of goods can be accomplished through many methods and through different modes, and often at some stage, a tractor truck pulling a chassis maybe involved. Accurate positioning of semi-trailer trucks is useful to achieve various intermodal transportation activities such as the loading/unloading process for cargo containers. A common approach for positioning a semi-trailer truck, however, is to simply rely on the skill level of a human driver. Human drivers may attempt to align semi-trailer trucks using mirrors, parking space lines, and/or general driving ability. Pin-point positioning of a semi-trailer truck requires a high degree of skill level. Further, relying solely on a human driver for positioning a semi-trailer truck, particularly in a precise location, may be time consuming.

One approach to assist with the placement of a semi-trailer truck utilizes stationary tire guides. Stationary tire guides can aid in directing a driver. Further, tire guides may aid in roughly aligning the tires of a semi-trailer truck. However, many tire guides are merely bummers or ridges that roughly define a parking spot. Sometimes visual aids or other tools may be used to position a semi-trailer truck, either alone or in combination with tire guides. Tire guides and other aids may encounter difficulties accounting for the different standard axle widths common on semi-trailer trucks, for instance 96 inch and 102 inch axle widths. The variations in axle width may introduce further positioning difficulties using conventional stationary guides.

SUMMARY

According to one aspect, a system for positioning a vehicle chassis having tires mounted on an axle associated with the chassis is provided. The system includes first and second tire guides spaced apart from one another wherein the first and second tire guides are configured to opposedly face one another. A plurality of tire guide sections are joined to form each of the first and second tire guides, and each tire guide section is adjustable within a range such that a distance between opposing tire guide sections may be adjusted. The tire guide sections are adjusted based on the position of the tires mounted on the axle associated with the chassis.

According to another aspect, a chassis guide system for centering a chassis of a vehicle having axles of variable widths is provided. The chassis guide system includes first and second tire guides spaced apart from one another and are mounted on a frame. The first and second tire guides are configured to opposedly face one another, and the first and second tire guides are substantially parallel. A plurality of tire guide sections are joined to form each of the first and second tire guides, each tire guide section being adjustable within a range such that a distance between opposing tire guide sections may be adjusted. The tire guide sections are adjusted based on the position of tires mounted on axles associated with the chassis.

According to yet another aspect, a system for positioning a vehicle chassis wherein tires are mounted on an axle associated with the chassis is provided. The system includes a tire guide having a plurality of tire guide sections joined to form the tire guide and wherein each tire guide section is adjustable within a range. The tire guide sections are adjusted based on the position of the tires mounted on the axle associated with the chassis. A plurality of tire guide sections are mounted to a frame and the plurality of tire guide sections are adjusted to move laterally in relation to the frame.

Other aspects and advantages will become apparent upon consideration of the following detailed description and the attached drawings wherein like numerals designate like structures throughout the specification.

BRIEF DESCRIPTION OF THE DRAWINGS

FIG. 3A is a plan view of a portion of the automatically aligning chassis guide system as the back two axles of a semi-trailer truck begin progressing through the system;

FIG. 3B is an enlarged plan view of the encircled portion of the automatically aligning chassis guide system as depicted in FIG. 3A;

FIG. 5A is a plan view of a portion of the automatically aligning chassis guide system as the back two axles of the semi-trailer truck progress through the centering section of the system;

FIG. 5B is an enlarged plan view of the encircled portion of the automatically aligning chassis guide system as depicted in FIG. 5A;

FIG. 6A is a plan view of a portion of the automatically aligning chassis guide system as the back two axles of the semi-trailer truck progress beyond the centering section of the system;

FIG. 6B is an enlarged plan view of the encircled portion of the automatically aligning chassis guide system as depicted in FIG. 6A;

FIG. 7 is a partially exploded view of the automatically aligning chassis guide system;

DETAILED DESCRIPTION

Figure 1A:
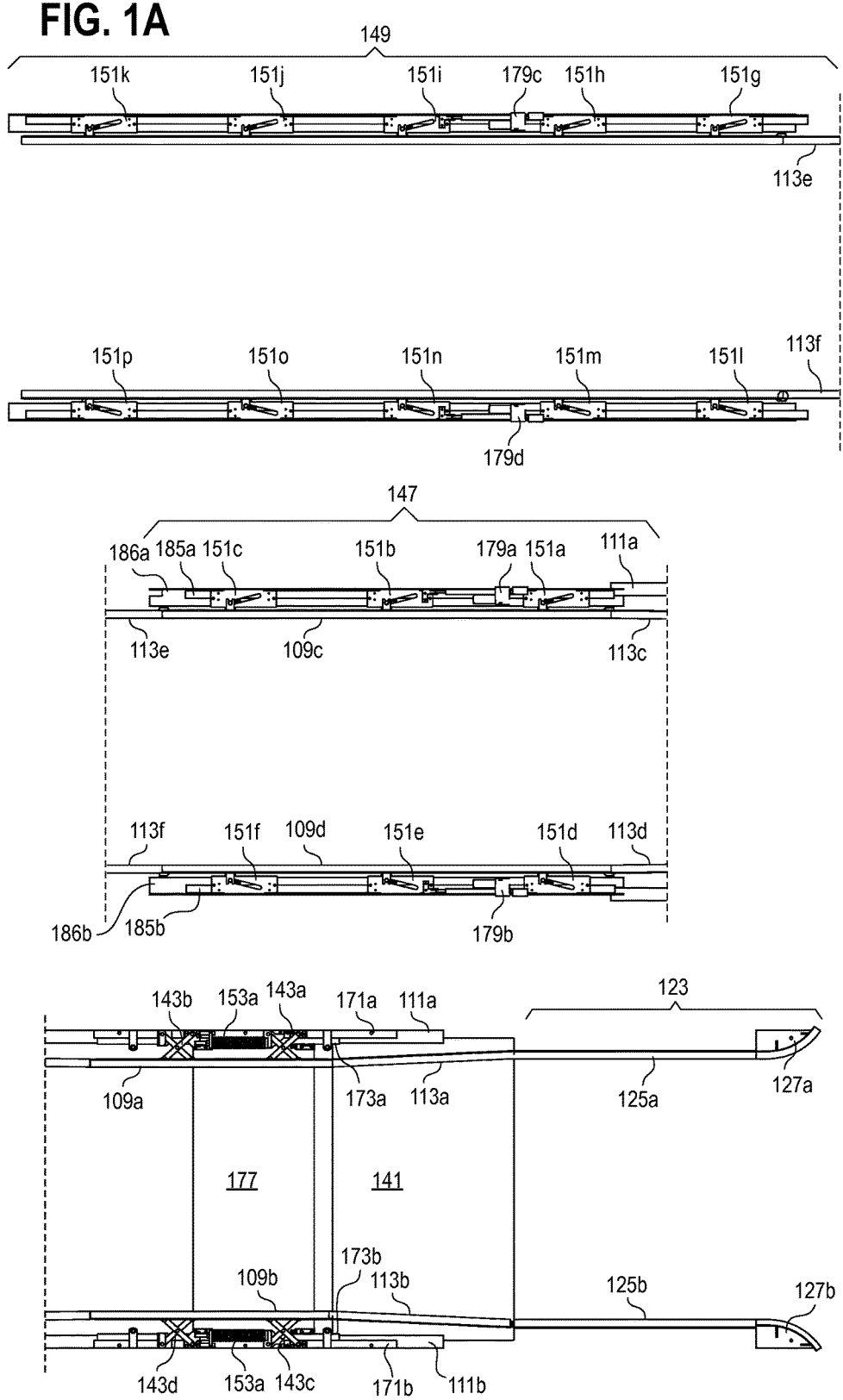
FIG. 1A is a plan view of an automatically aligning chassis guide system.
Figure 1B:
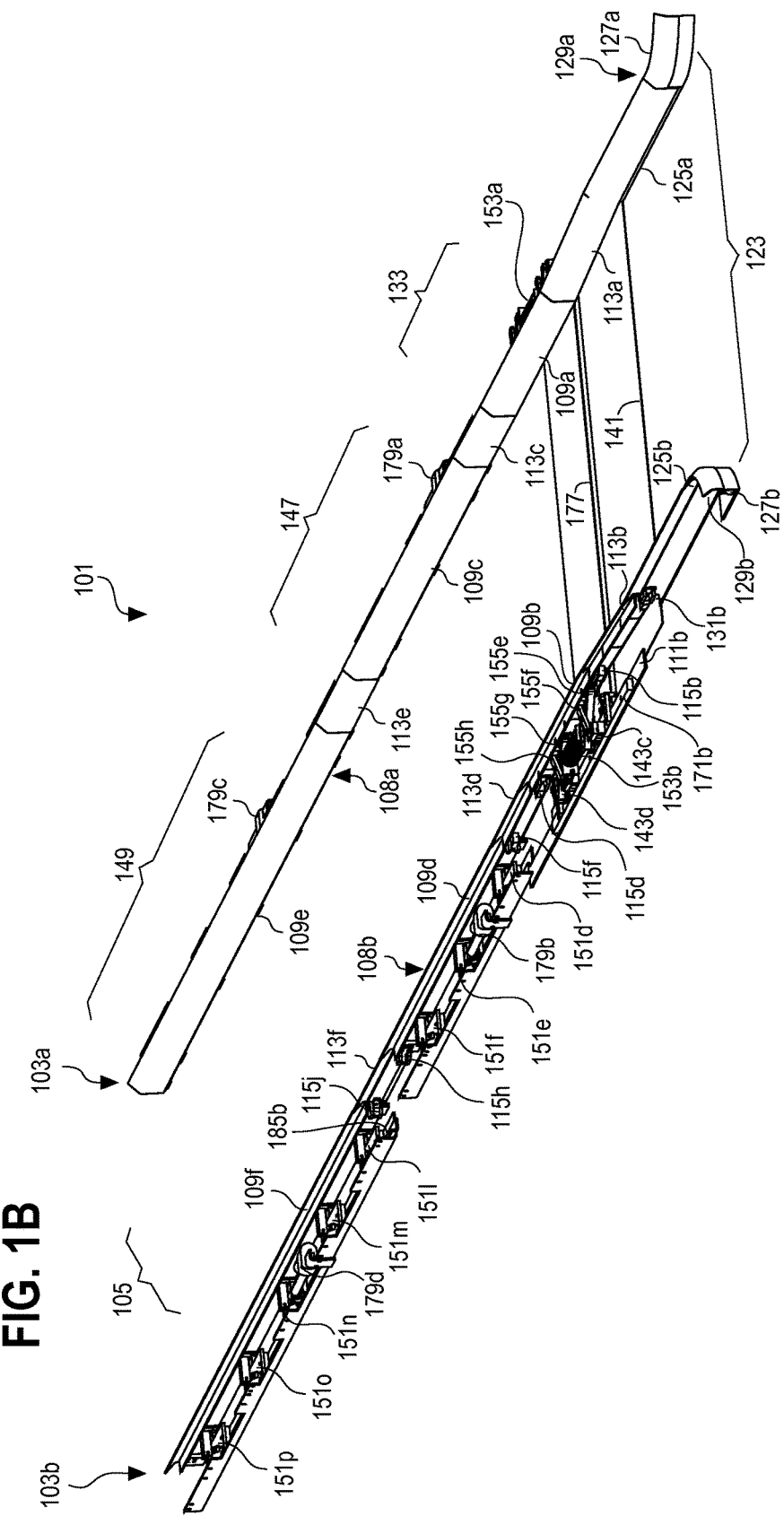
FIG. 1B is an isometric view of the automatically aligning chassis guide system of FIG. 1A.

Referring to FIGS. 1A and 1B, an example embodiment of an automatically aligning chassis guide system 101 includes chassis guide mechanisms 103a, 103b on either side of a space 105 intended for a semi-trailer truck 107, as shown in FIGS. 3A, 3C, 4A, 4B, 5A, 5C, 6A, 6C, 8A, 8B, 9A, and 9B, to occupy. The chassis guide mechanisms 103a, 103b, FIGS. 1A and 1B, direct the semi-trailer truck into a known location within space 105 between tire guide sections 109a, 109b, 109c, 109d, 109e, and 109f. In addition to directing a semi-trailer truck 107 into a known location, the automatically aligning chassis guide system 101 may align a semi-trailer truck 107 with a cargo bay that the semi-trailer truck 107 is approaching. The alignment of the semi-trailer truck 107 with the cargo bay happens through centering of the semi-trailer truck 107. Frequently, the semi-trailer truck 107 approaches the cargo bay backwards, i.e. the semi-trailer 107 truck is backed in by a driver. However, alternative embodiments contemplate applications of the automatically aligning chassis guide system 101 using a drive through centering mechanism such that the driver would drive forward through the system. The automatically aligning chassis guide system 101 in this embodiment, for example, may accommodate axle widths from 96 inches to 102 inches; however use in connection with alternative axle widths are also contemplated.

In one example embodiment, a plurality of linked tire guides may include three linked tire guides (with sections 109a, 109c, and 109e linked, and sections 109b, 109d, and 109f linked). In this example, each linked set of three guides may be coupled to a stationary guide mounting block 111a, 111b or stationary guide angle 186a, 186b, 186c, 186d to form a chassis guide mechanism 103a, 103b. The two chassis guide mechanisms 103a, 103b are configured such that the tire guides 109a, 109b, 109c, 109d, 109e, 109f are spaced apart and face inward toward the opposing respective tire guides (109a faces 109b, 109c faces 109d, 109e faces 109f) on the opposite side of the space 105. The three linked tire guides (109a, 109c, and 109e are linked, and 109b, 109d, and 109f are linked) may be connected by way of linking guides 113a, 113b, 113c, 113d, 113e, 113f. The linking guides 113a, 113b, 113c, 113d, 113e, 113f may have hinges 115a-115l on both ends. The chassis guide mechanisms 103a, 103b in this example have a plurality of tire guides (109a faces 109b, 109c faces 109d, 109e faces 109f) arranged with inward-facing outer surfaces 108a, 108b separated by approximately the distance between outer-edge surfaces 117 of outermost tires 119, FIG. 3A, attached to an axle 121a, 121b, 122a, 122b having the narrowest axle width accommodated by the system 101. This distance represents the space 105 intended for a semi-trailer truck 107 to occupy after entering the automatically aligning chassis guide system 101.

Referring once again to FIGS. 1A and 1B, in this embodiment, at the front of the automatically aligning chassis guide system 101 is stationary front section 123. The stationary front section 123 may include rounded front corners and straight front linking guides 125a, 125b. The length of the straight front linking guides 125a, 125b may, for example, be approximately eight feet, however other lengths may selectively be employed. The stationary front section 123 is the initial target that provides for rough alignment of the semi-trailer truck 107 with the cargo bay as the semi-trailer truck 107 is being backed-in by the driver. As such, the straight front linking guides 125a, 125b of the opposing chassis guide mechanisms 103a, 103b may be spaced apart more than 102 inches. The straight front linking guides 125a, 125b may be coupled to posts 127a, 127b at the front end of each chassis guide mechanism 103a, 103b. In alternative embodiments, the straight front linking guides 125a, 125b may not be entirely stationary, but instead may have a flexible bearing 129a, 129b connected to the front post 127a, 127b on one end, and another flexible hinge 131a, 131b connected to a linking guide 113a, 113b that transitions to the centering tire guide section 133. Further, in other embodiments, the straight front linking guides 125a, 125b, or one of the linking guides 113a, 113b between the stationary front section 123 and the centering tire guide section 133, may be the initial point where tires 119 of an approaching semi-trailer truck 107 contact the chassis guide mechanisms 103a, 103b, as depicted in FIG. 3A.

Figure 3C:
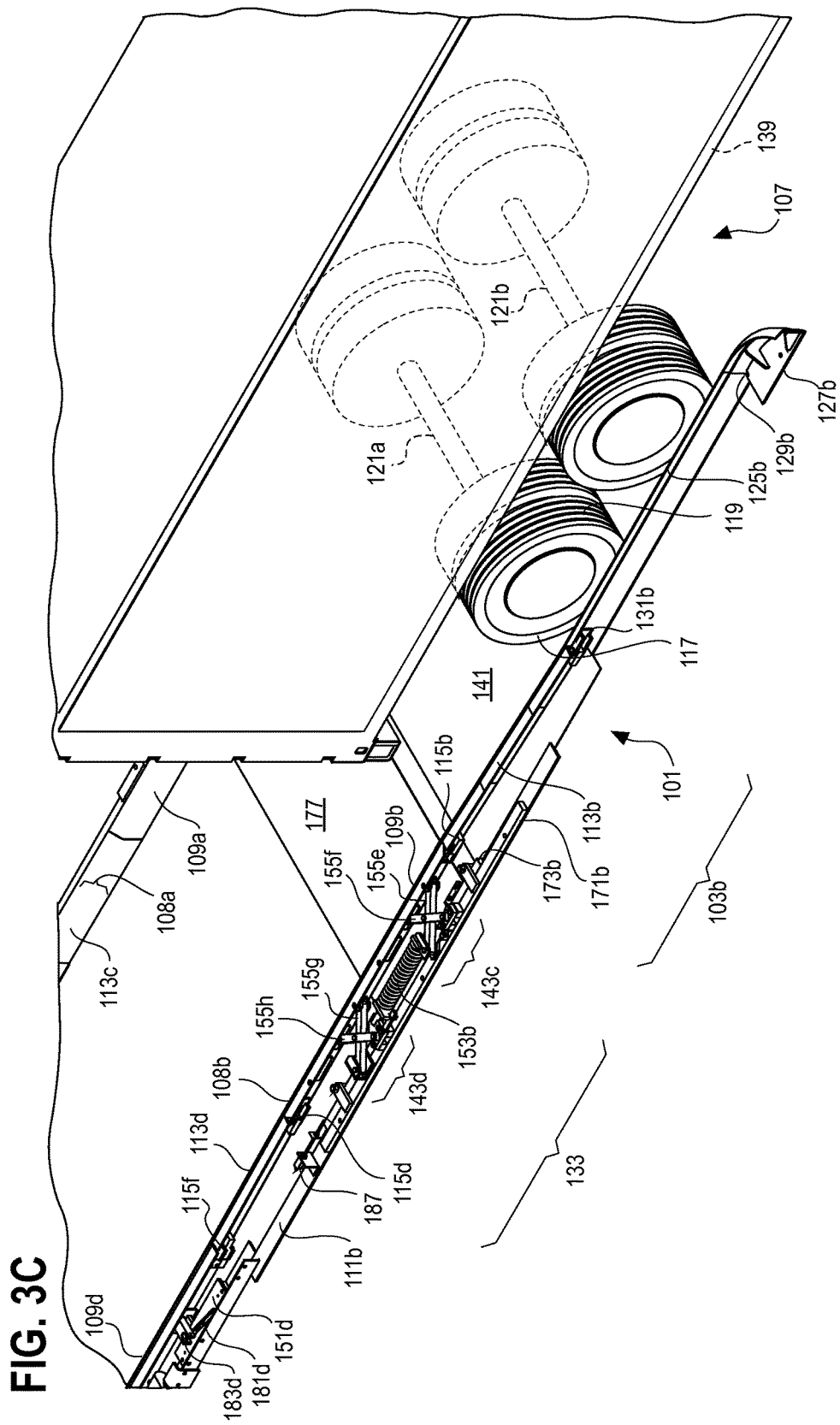
FIG. 3C is an isometric view of the portion of the automatically aligning chassis guide system of FIG. 3A.

Coupled to the stationary front section 123 is the centering section 133, FIGS. 3A and 3C. In this example, the centering section 133 includes the foremost tire guide sections 109a, 109b. In alternative embodiments, the linking guides 113a, 113b may connect the straight front linking guides 125a, 125b with the foremost tire guides 109a, 109b. The centering section 133 is configured such that the tire guides 109a, 109b of the centering section 133 may assume an initial position where the inside surfaces 108a, 108b of the chassis guide mechanisms 103a, 103b opposedly facing one another are spaced apart 96 inches, or less than 96 inches, in contrast to the straight front linking guides 125a, 125b that are spaced apart by more than 102 inches.

When tires 119 contact the centering section 133 on either side of the automatically aligning chassis guide system 101, the tire guides 109a, 109b direct the semi-trailer truck 107 towards the center of the space 105 spanning the centering section 133. The weight of the semi-trailer truck 107, and the weight of any load being carried by a chassis 139, as depicted in FIG. 3A, may cause friction between the tires 119 and the ground. The frictional forces may resist the change in direction of the semi-trailer truck 107 developed by the foremost tire guides 109a, 109b; the operation of such centering section 133 and the application of force by the foremost tire guides 109a, 109b to be described with more particularity below. In an example embodiment, the chassis 139 enters between the chassis guide mechanisms 103a, 103*b* far enough off-center that the tire 119 on only one side of the chassis 139 contacts one of the tire guides 109*a*, 109*b*. However, once the axles 121*a*, 121*b* have been shifted to center then contact may be made with both tire guides 109*a*, 109*b* by the tires 119. The force of the tires 119 acting on the tire guides 109*a*, 109*b* on both sides will be sufficient to open the tire guides 109*a*, 109*b* of the centering section 133.

Figure 1C:
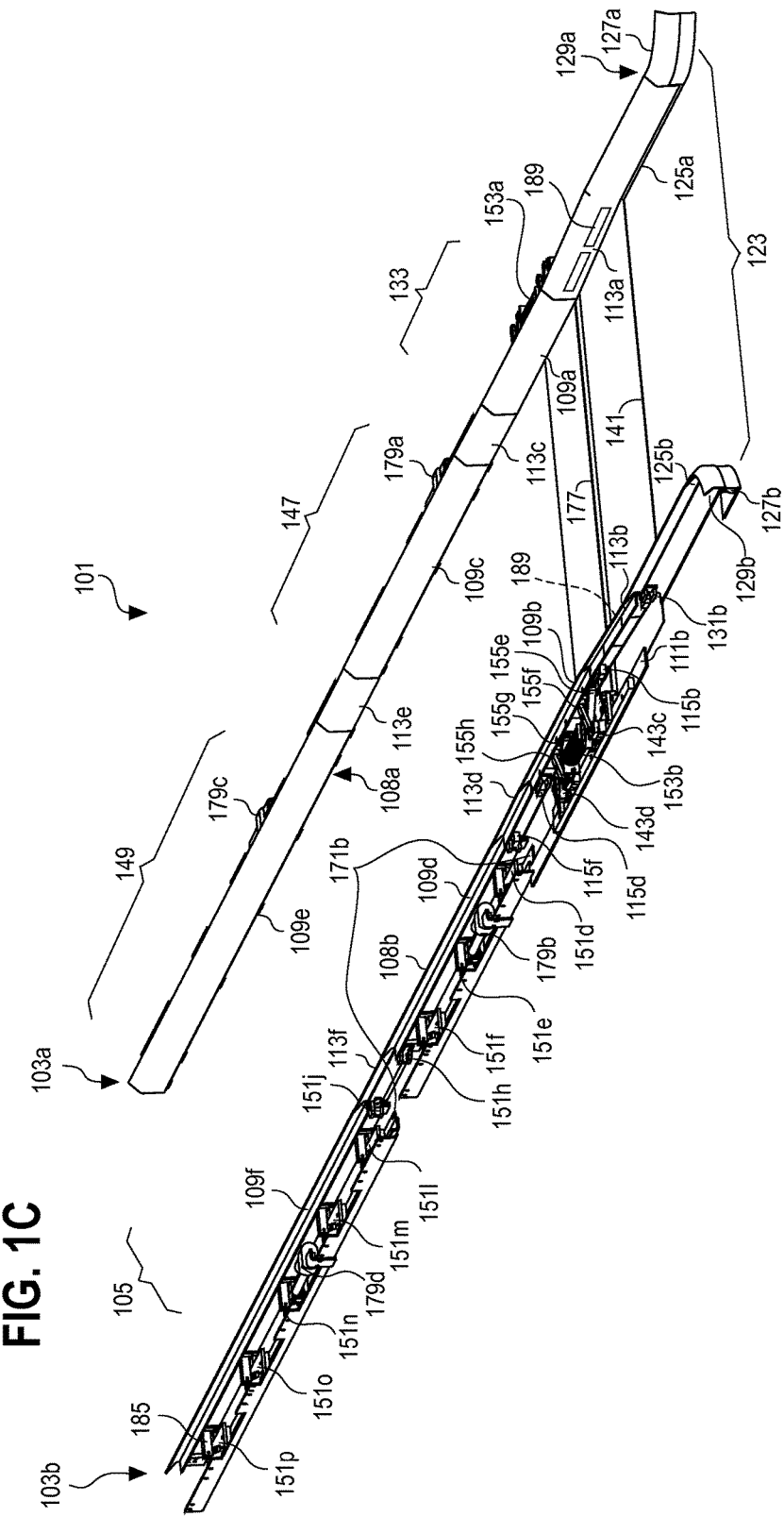
FIG. 1C is an isometric view of an alternative embodiment of the automatically aligning chassis guide system of FIG. 1A.
Figure 5C:
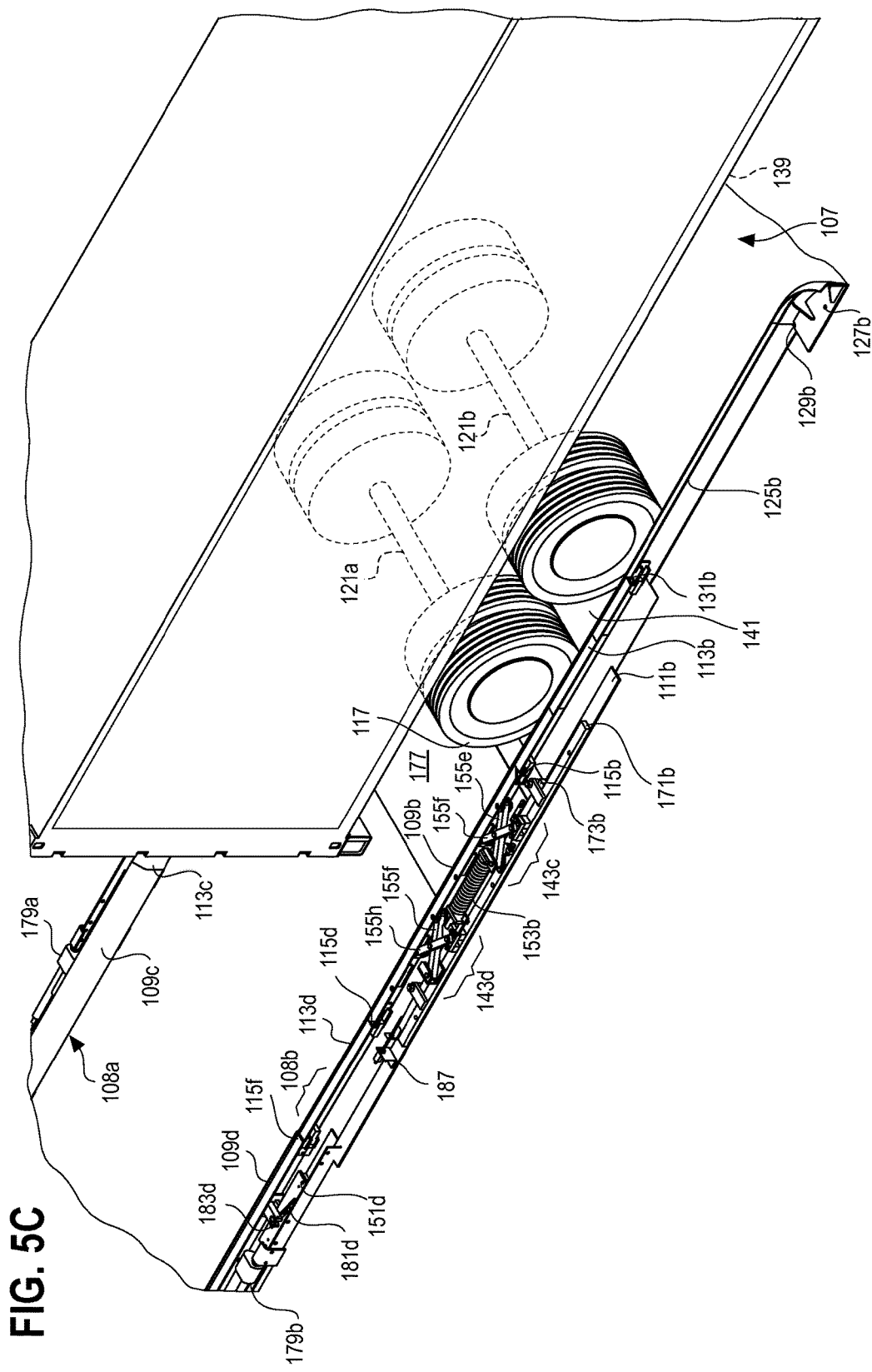
FIG. 5C is an isometric view of the portion of the automatically aligning chassis guide system of FIG. 5A.

A platen 141 may be connected to the stationary guide mounting blocks 111*a*, 111*b* on either side of the space 105 between the linking guides 113*a*, 113*b*, just before the centering section 133. In this example, the platen 141 may be a stationary sheet of steel, although other suitable materials may be used. The platen 141 is configured such that it is attached to the mounting blocks 111*a*, 111*b*, on either side of the automatically aligning chassis guide 101, to which the chassis guide mechanisms 103*a*, 103*b* are mounted. The platen 141 passes under the linking guides 113*a*, 113*b* crossing the space 105 where the tires of the semi-trailer truck 107 contact the ground as the semi-trailer truck 107 is backed into the automatically aligning chassis guide 101. The sheet of steel 141 across the ground spanning the centering section 133 may create a surface with reduced friction under the tires 119, as shown in FIGS. 5A and 5C. The decrease in frictional forces created by the tires 119 as the tires 119 travel across the platen 141 allows the tire guides 109*a*, 109*b* of the centering section 133 to use lower force in maintaining their position and sliding the tires 119 across the steel sheet 141 while shifting the semi-trailer truck 107 towards center. Linking guides 113*a*, 113*b* may further include rollers 189, as seen in the alternative embodiment depicted in FIG. 1C. The rollers 189 prevent the tires 119 from climbing the linking guides 113*a*, 113*b* during the initial contact and centering of the chassis 139. The rollers 189 may be separated into segments along the linking guides 113*a*, 113*b* and/or tire guides 109*a*, 109*b*. A moving platen 177, the operation of which is described in detail below, spans the space between the tire guides 109*a*, 109*b* of the centering section 133 in example embodiments.

Figure 2:
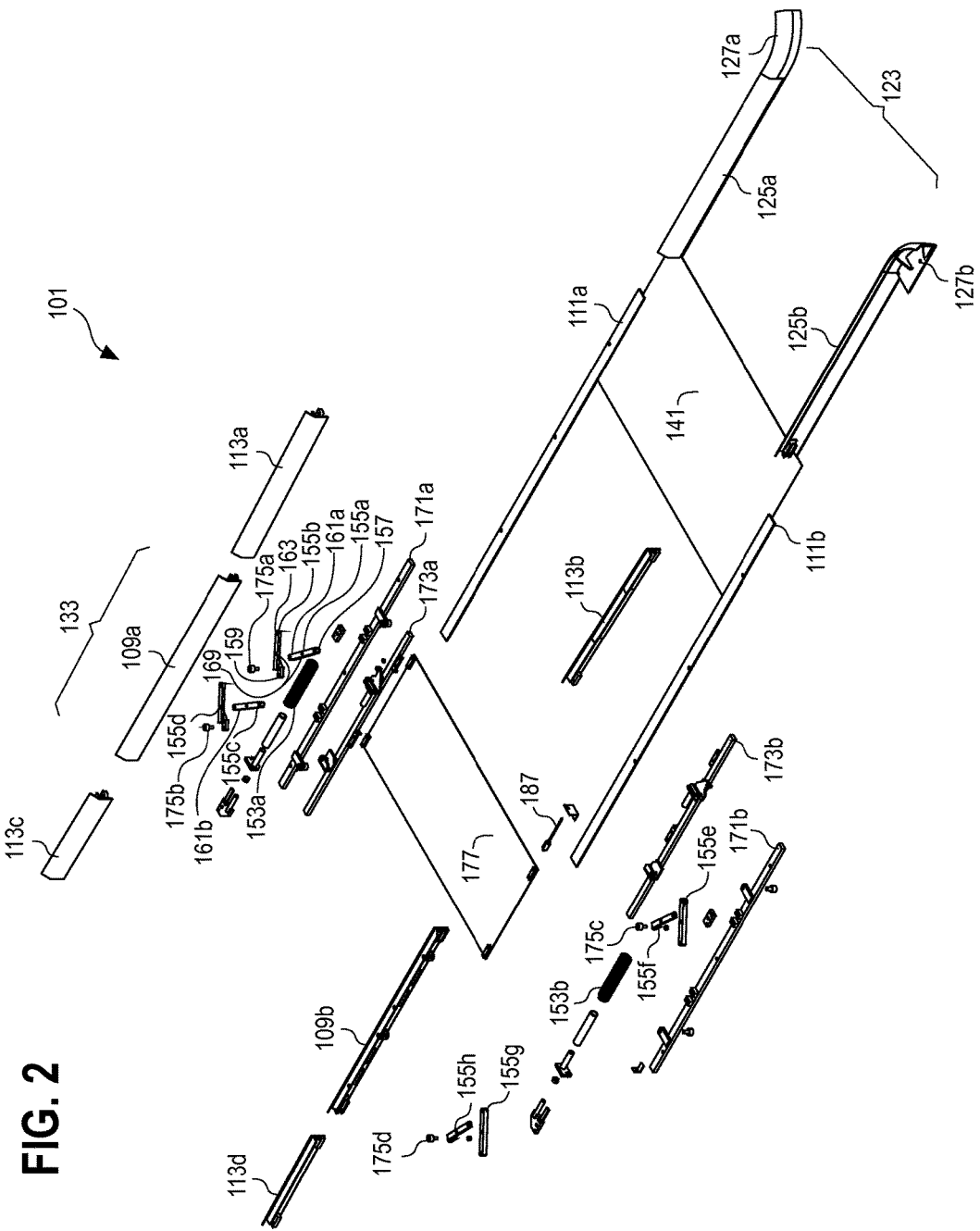
FIG. 2 is a partially exploded view of the automatically aligning chassis guide system.

Referring now to FIG. 2, the example components of the centering section 133 are shown in an exploded view. Each side of the centering section 133 includes the foremost tire guides 109*a* and 109*b*. Further scissor hinges 143*a*, 143*b*, 143*c*, 143*d*, as seen in FIGS. 1A and 1B, may be constructed from links 155*a*, 155*b*, 155*c*, 155*d*, 155*e*, 155*f*, 155*g*, 155*h* shown separately in FIG. 2. Each scissor hinge 143*a*, 143*b*, 143*c*, 143*d* is constructed from two of the links (143*a* includes 155*a* and 155*b*, 143*b* includes 155*c* and 155*d*, 143*c* includes 155*e* and 155*f*, 143*d* includes 155*g* and 155*h*). The points where each of the links terminates form pivot points and are coupled to either the tire guides 109*a*, 109*b* or the guide mounting blocks 111*a*, 111*b*. Using the example of scissor hinge 143*a*, shown in a working arrangement in FIG. 3A, a first pivot point 157 and a second pivot point 159 are coupled to the tire guide 109*a*, and a third pivot point 161*a* and a fourth pivot point 163 are coupled to the guide mounting block 111*a* by connections to a moving guide bar 173*a* and a fixed mounting bar 171*a*, respectively. The pivot points 157, 159 coupled to the tire guide 109*a* are spaced apart the same distance as the two pivot points 161*a*, 163 coupled to the guide mounting block 111*a*. FIG. 2 further shows the linking guides 113*a*, 113*b*, 113*c*, and 113*d* that are on either end of the foremost tire guides 109*a* (113*a* and 113*c* are on either end of 109*a*) and 109*b* (113*b* and 113*d* are on either end of 109*b*). The exploded view of FIG. 2 also shows the relative arrangements of the moving platen 177 and the stationary platen 141.

Figure 4A:
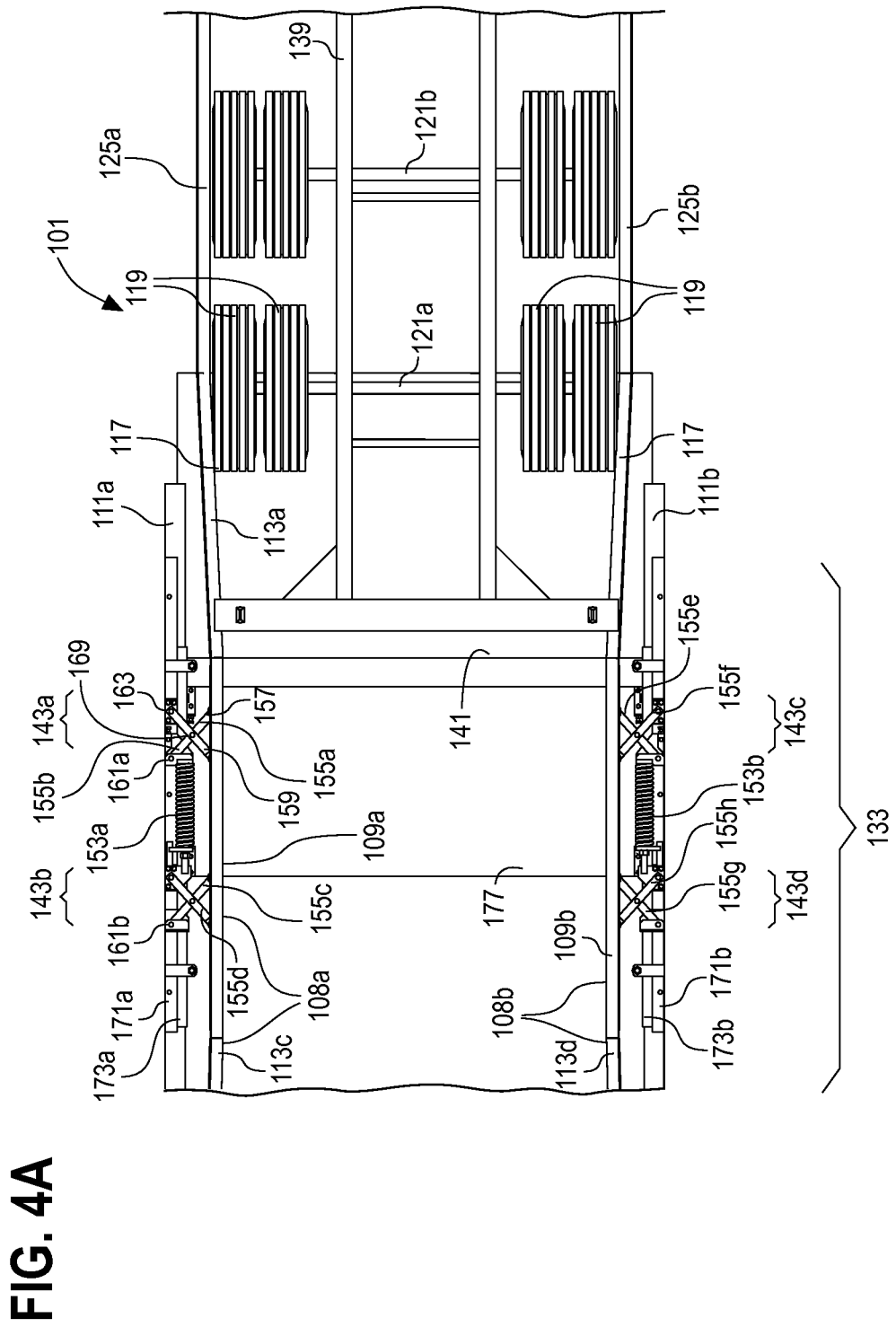
FIG. 4A is a plan view of a portion of the automatically aligning chassis guide system as the back two axles of the semi-trailer truck progress through the system.
Figure 4B:
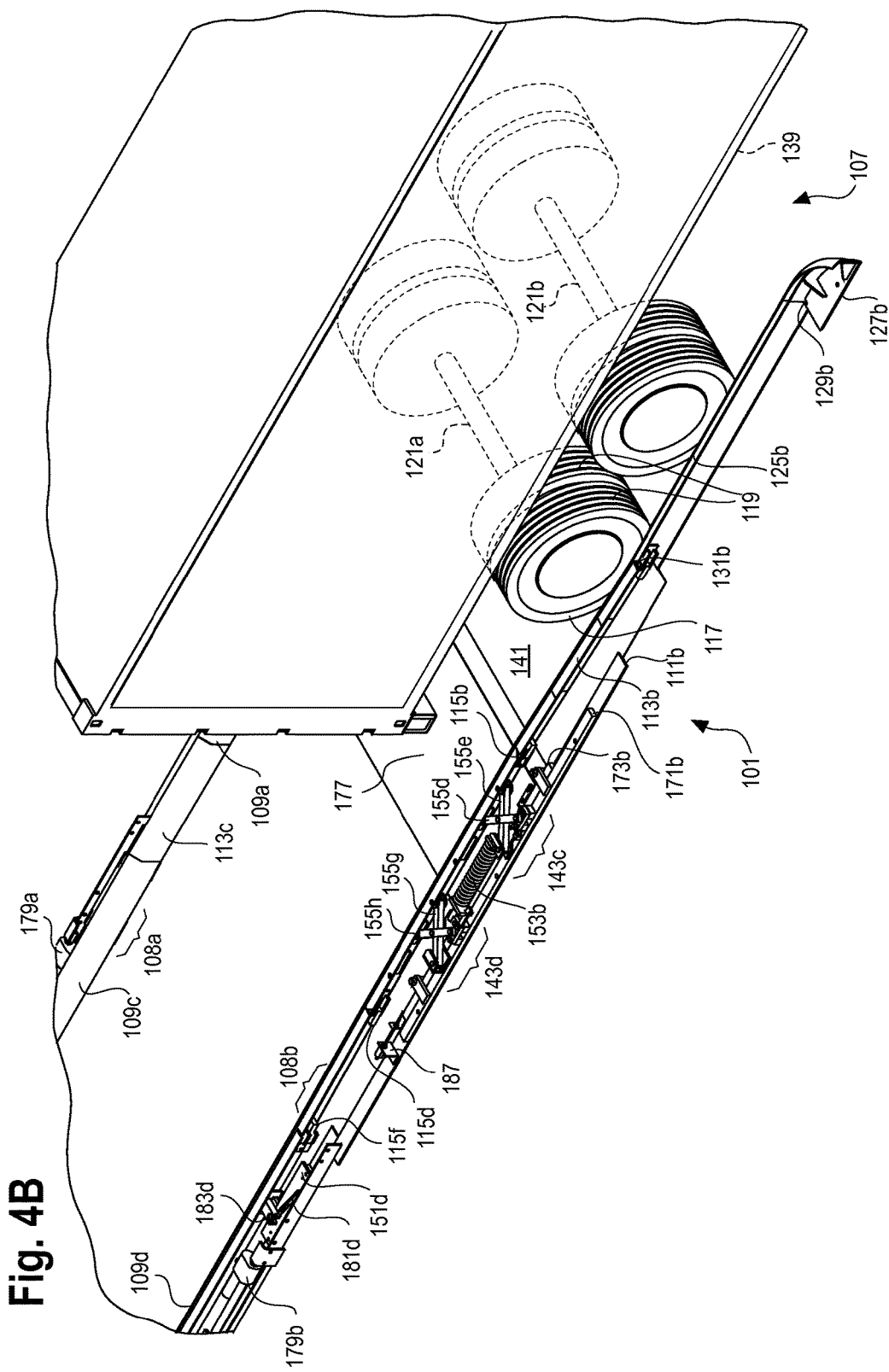
FIG. 4B is an isometric view of the portion of the automatically aligning chassis guide system of FIG. 4A.

Referring ahead to FIGS. 4A and 4B, the tires 119 of the semi-trailer truck 107 may be used to create a force that compels adaptation of an automatically aligning chassis guide system 101. As an example of typical use, a semi-trailer truck 107 may be directed to enter the space 105 by the driver. As the driver begins to enter the space 105 to be occupied by the semi-trailer truck 107, the outer edge surfaces 117 of the outermost tires 119 on either side of the chassis 139 will contact the inward-facing surfaces 108*a*, 108*b* of the chassis guide mechanisms 103*a*, 103*b* at the linking guides 113*a*, 113*b* connecting the stationary front section 123 to the centering section 133. As seen in FIGS. 1A and 1B, in an exemplary embodiment, the connection mounting the foremost tire guide sections 109*a*, 109*b* to the guide mounting block 111*a*, 111*b* may be in the form of a scissor hinge 143*a*, 143*b*, 143*c*, 143*d*, to be described in more detail below. The connection mounting middle tire guides 109*c*, 109*d*, of the middle power-driven section 147, and rear tire guides 109*e*, 109*f*, of the rear power-driven section 149, to the guide mounting blocks 111*a*, 111*b* may be in the form of slotted guide plates 151*a*-151*p*.

Figure 10:
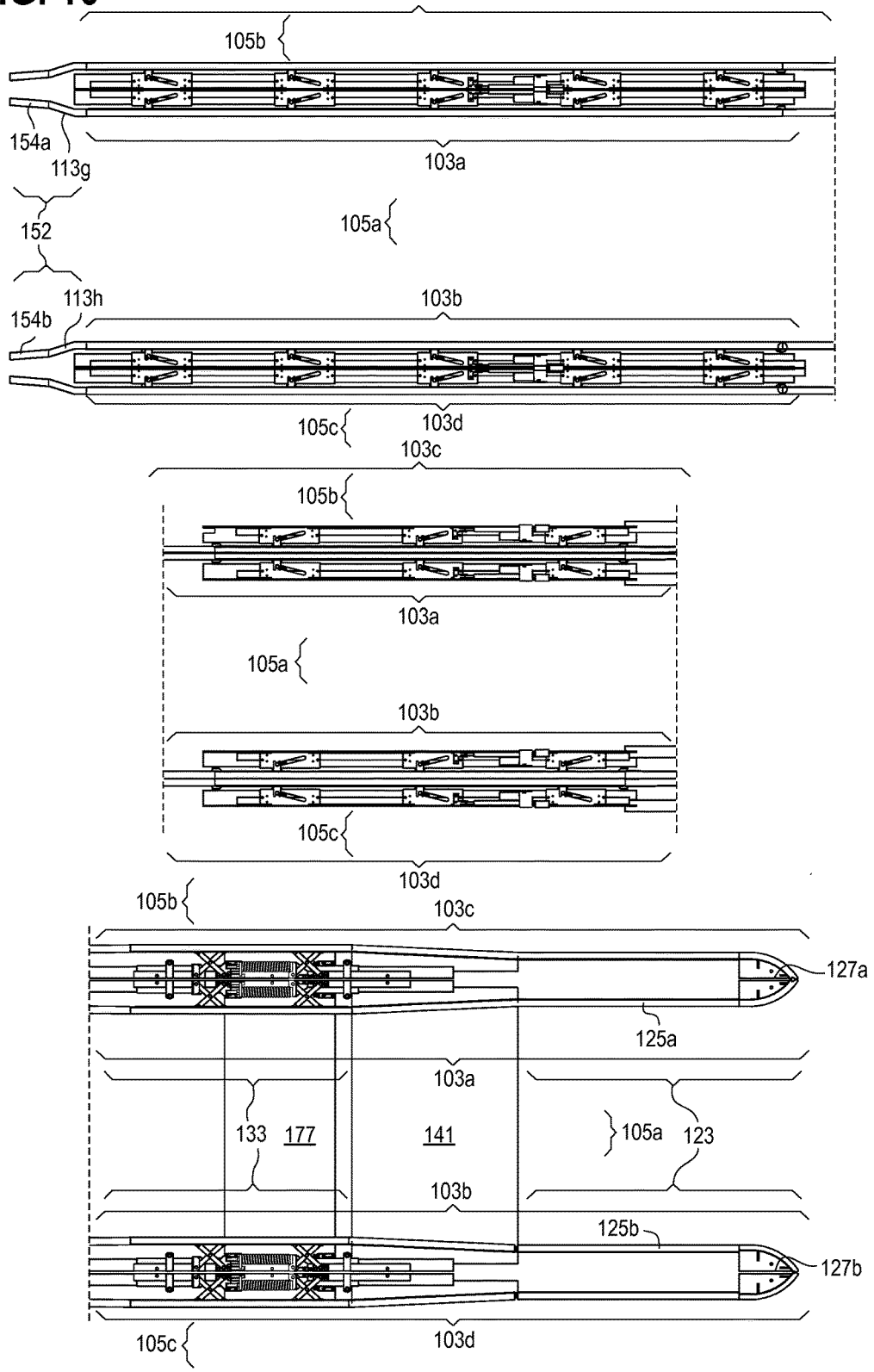
FIG. 10 is a plan view of a configuration of a plurality of automatically aligning chassis guide systems.

The rear power-driven section 149, FIG. 1, may extend to cover the entire length of travel of the rear axle 121*a* of the chassis. Referring ahead now to FIG. 10, depending on where the tire guides 109*e*, 109*f* end, additional linking guides may exist between the rear power-driven section 149 and a stationary end section 152, FIG. 10, of the automatically aligning chassis guide system 101. In this example, any necessary linking guides 113*g*, 113*h* for transitioning from the rear power-driven section 149 to the stationary end section 152 operate in a manner similar to the linking guides 113*a*-113*f* between the other tire guides 109*a*-109*f*. The stationary end section 152 in this example may include stationary rear linking guides 154*a*, 154*b* fixedly spaced at approximately 102 inches or greater. The stationary end section 152 may be further configured to resemble the stationary front section 123.

In alternative embodiments, movement of the tire guides 109*a*, 109*b*, 109*c*, 109*d*, 109*e*, and 109*f* may be achieved through alternative connections to the stationary guide mounting blocks 111*a*, 111*b* and stationary guide angles 186*a*, 186*b*, 186*c*, 186*d*. One configuration of the connections between the tire guides 109*a*, 109*b* and the stationary guide mounting blocks 111*a*, 111*b* includes scissor hinges 143*a*, 143*b*, 143*c*, 143*d* facilitating movement for the centering section 133, and linear actuators 179*a*, 179*b*, 179*c*, 179*d* facilitating movement of the middle and rear power-driven sections 147, 149, as seen in FIGS. 6A, 6C, 8A, and 8B.

In an example embodiment, the centering section 133 includes the foremost tire guides 109*a*, 109*b* on either side moving parallel to each other and maintaining force against the tires 119 to keep the axles 121*a*, 121*b* centered, as depicted in FIGS. 3A, 3C, 4A, 4B, 5A, and 5C. For the purposes of this example, axles 121*a* and 121*b* have approximately a 102 inch width and axles 122*a*, 122*b*, 122*c*, to be discussed below, have approximately a 96 inch width. By applying force to the tires 119 from either side of the centering section 133, the chassis 139 is directed to the center of the space 105. Referring now to FIG. 2, the scissor hinges 143*a*, 143*b*, 143*c*, 143*d* that provide the connection between the foremost tire guides 109*a*, 109*b* and the guide mounting blocks 111*a*, 111*b* may be coupled to at least one spring 153*a*, 153*b*. As will be described in more detail below, the scissor hinges 143*a*-143*d* are closed when the tire guides 109*a*, 109*b* are closest to one another, as depicted in FIGS. 3A and 3C. The scissor hinges 143*a*-143*d* open as the tire guides 109a, 109b adjust to be farther apart, such as to accommodate a larger axle. FIGS. 4A and 4B show the scissor hinges 143a-143d beginning to open as the tire guides 109a and 109b move through their intended range of motion, typically from somewhat closer than approximately 96 inches to approximately 102 inches. The scissor hinges are depicted as approximately fully open in FIGS. 6A and 6C, as the 102 inch axles 121a, 121b pass through the centering section 133 and the tire guides 109a, 109b are at the widest point in their range of motion.

Figure 6C:
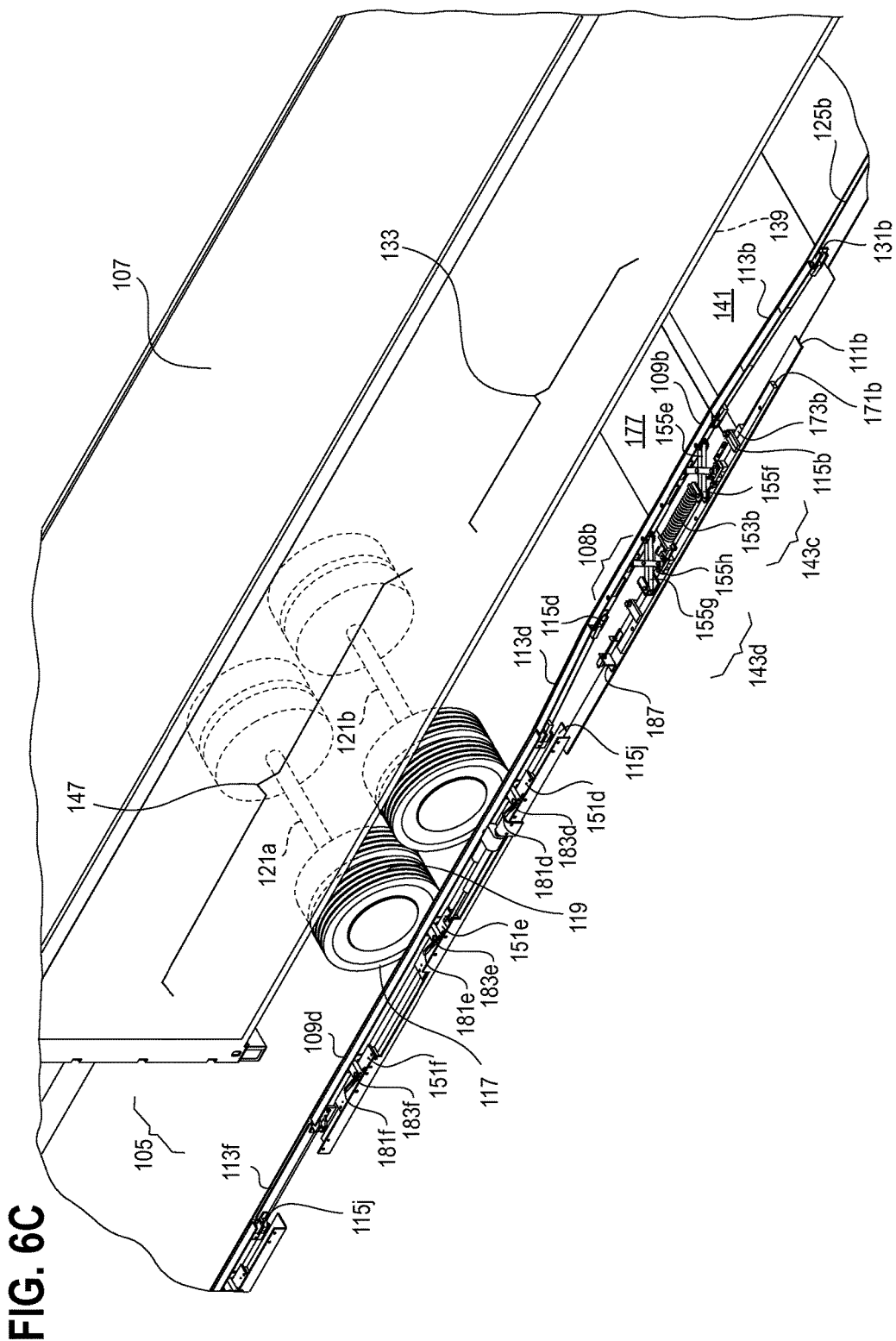
FIG. 6C is an isometric view of the portion of the automatically aligning chassis guide system of FIG. 6A.

Referring now to FIGS. 6A and 6C, once the tires 119 no longer exert force on the foremost tire guides 109a, 109b the scissor hinges 143a, 143b, 143c, 143d are no longer held open. Therefore, any other force exerted on the scissor hinges 143a, 143b, 143c, 143d, such as an opposing force provided by one of the springs 153a, 153b, will act to close the scissor hinges (scissor hinges 143a and 143b being closed by spring 153a; scissor hinges 143c and 143d being closed by spring 153b). The force of the springs 153a, 153b is exerted along the horizontal plane, i.e. up and down the length of each chassis guide mechanism 103a, 103b. The scissor hinges 143a, 143b, 143c, 143d, the springs 153a, 153b, and the moving platen 177 coupling the two sides of the automatically aligning chassis guide system 101 and spanning the space between the foremost tire guides 109a, 109b, all form, in combination the operational portions of the centering section 133. However, these components are driven into position by the force developed when the tires 119 contact either the foremost tire guide sections 109a, 109b or the linking guides 113a, 113b between the stationary front section 123 and the centering section 133. FIGS. 3A, 3C, 4A, and 4B depict the development of force as the tires 119 contact the linking guides 113a, 113b.

In an example embodiment, the connection between the foremost tire guides 109a, 109b and the guide mounting blocks 111a, 111b may be made up of two linked scissor hinges (scissor hinges 143a and 143b connected to 111a; scissor hinges 143c and 143d connected to 111b) as can be seen at least in FIG. 3A. Referring now to the exploded view of FIG. 2, the scissor hinges 143a, 143b, 143c, 143d may be constructed from links 155a, 155b, 155c, 155d, 155e, 155f, 155g, 155h. Each scissor hinge 143a, 143b, 143c, 143d is constructed from two of the links (143a includes 155a and 155b, 143b includes 155c and 155d, 143c includes 155e and 155f, 143d includes 155g and 155h).

Scissor hinge 143a is described herein, by way of example, however it will be appreciated by those of ordinary skill in the art that the components and operation with respect to scissor hinge 143a would be reflected in the other scissor hinges 143b, 143c, 143d of the system 101. Scissor hinge 143a includes two links 155a, 155b. The ends of the two links 155a and 155b create pivot points with either the tire guide 109a or the guide mounting block 111a. A first pivot point 157 and a second pivot point 159 are coupled to the tire guide 109a, and a third pivot point 161a and a fourth pivot point 163 are coupled to the guide mounting block 111a. The pivot points 157, 159 coupled to the tire guide 109a are spaced apart the same distance as the two pivot points 161a, 163 coupled to the guide mounting block 111a. Pivot point 157 is the end of link 155a and pivot point 159 is the end of link 155b. Likewise, pivot point 161a is the opposite end of link 155a and pivot point 163 is the opposite end of link 155b. The arrangement of the pivot points is shown at least in FIGS. 3A and 4A while the individual components are at least shown in FIG. 2.

As seen in FIGS. 3A, 3B, and 4A, the links 155a and 155b of the scissor hinge 143a are coupled at the point where the first link 155a crosses a second link 155b creating a common pivot 169 in the middle of the links 155a, 155b. The first pivot point 157 of the first link 155a is pinned to the back of the tire guide 109a. The third pivot point 161a on the other end of the first link 155a is pinned to the moving guide bar 173a that is constrained by the fixed mounting bar 171a. The moving guide bar 173a moves only parallel to the tire guides 109a, 109b (i.e. horizontal to the length of the chassis guide mechanisms 103a, 103b and in the same plane as the force applied by the springs 153a, 153b). The second pivot point 159 of the second link 155b incorporates a roller 175 such that it contacts the back of the tire guide 109a. The fourth pivot point 163 of the second link 155b of the scissor hinge 143a is pinned to a set location on the fixed mounting bar 171a. The first pivot point 157 of the first link 155a pinned to the back of the tire guide is opposite the fourth pivot point 163 of the second link 155b, which is pinned to the fixed mounting bar 171a.

Referring again now to FIGS. 3A, 3C, 4A, and 4B, in an example embodiment, when sufficient force is applied to the tire guides 109a and 109b the scissor hinges 143a, 143b, 143c, 143d will open. The tire guides 109a and 109b move further apart when each tire guide 109a, 109b moves closer to the stationary guide mounting blocks 111a and 111b, respectively, as shown in FIGS. 5A and 5C. Referring still to FIGS. 5A and 5C, the scissor hinges 143a, 143b constrain the motion of the tire guide 109a such that it only moves substantially perpendicular to the surfaces 108a, 108b of the chassis guide mechanisms 103a, 103b. Similarly, the scissor hinges 143c and 143d constrain the motion of the tire guide 109b.

Again using the movement of tire guide 109a as an example, the second pivot point 159 of the second link 155b having the roller 175 moves along the back of the tire guide 109a. The third pivot point 161a of the second link 155b is pinned to the guide bar 173a that is constrained by the fixed mounting bar 171a so that the second link 155b moves the guide bar 173a in a generally parallel direction to the length of the chassis guide mechanism 103a. The moving guide bar 173a and its counterpart on the other side, moving guide bar 173b, are coupled to the moving platen 177, which runs under the tire guides 109a and 109b on the ground and across the space 105 between the chassis guide mechanisms 103a, 103b. The coupling of the moving guide bars 173a and 173b to the moving platen 177 constrains the moving guide bars 173a, 173b to movement in unison. Therefore, when the tires 119 cause the scissor hinges 143a, 143b, 143c, 143d to open, such as to accommodate 102 inch axles 121a, 121b of a semi-trailer truck, the scissor hinges 143a-d all open equivalent amounts.

The opening and closing of the scissor hinges 143a-d is synchronized because one pivot point of each scissor hinge 143a-d is attached to the moving guide bar 173a, 173b associated with the side of the automatically aligning chassis guide system 101 corresponding to each scissor hinge 143a-143d. For example, pivot point 161a of scissor hinge 143a and pivot point 161b of scissor hinge 143b are connected to moving guide bar 173a as part of chassis guide mechanism 103a. Likewise, as seen in FIG. 3B, corresponding pivot points of scissor hinges 143c and 143d are connected to moving guide bar 173b as part of chassis guide mechanism 103b. Both the moving platen 177 and the moving guide bars 173a, 173b move parallel to the tire guides 109a, 109b. In an example embodiment, when the components of the centering section 133 are driven into position by the force developed when the tires 119 contact either the foremost tire guide sections 109a, 109b or the linking guides 113a, 113b as described above, the connected portions of the centering section 133, including the moving platen 177 and the moving guide bars 173a, 173b slide towards the rear of the automatically adjusting chassis guide system 101 as the scissor hinges 143a-d open. In this way, as the pivot points of the scissor hinges 143a-d are spread apart, the pivot points 161a, 161b, 161c, 161d connecting the two sides 103a, 103b slide parallel to the tire guides 109a, 109b towards the back of the automatically adjusting chassis guide system 101 to allow the scissor hinges 143a-d to open simultaneously and to the same width. Further, the moving platen 177 operatively couples the two chassis guide mechanisms 103a, 103b and may result in the tire guides 109a, 109b only moving when the tires 119 contact both of the chassis guide mechanisms 103a, 103b. The force created by the tires 119 on only one of the two chassis guide mechanisms 103a, 103b is not enough to overcome the resistive force of the springs 153a, 153b on both sides. In example embodiments, the front pivot points 161a, 161c may be coupled to the moving guide bars 173a, 173b by blocks 172a, 172b that transfer the force of the springs 153a, 153b to the scissor hinges 143a, 143c and vice versa.

Referring now to FIGS. 6A and 6C, in an example embodiment, the configuration of the scissor hinges 143a, 143b, 143c, 143d disposes the springs 153a, 153b so as to exert force perpendicular to the direction of movement of the tire guides 109a, 109b. Such a disposition of the springs 153a, 153b allows the springs 153a, 153b to close the scissor hinges (143a and 143b being closed by spring 153a; 143c and 143d being closed by spring 153b) when contact from the tires 119 is not present to hold the scissor hinges 143a, 143b, 143c, 143d open. In this way, the scissor hinges 143a, 143b, 143c, 143d are able to close once a set of tires 119 has moved past the centering section 133. The springs 153a and 153b on either side are positioned between the moving guide bars 173a, 173b and the fixed mounting bars 171a, 171b, respectively. The springs 153a, 153b resist the motion of the moving guide bars 173a, 173b. The resistance provided by the springs 153a, 153b is such that it holds in position the centering action of the chassis guide mechanisms 103a, 103b by resisting the pushing of the tires 119 against the foremost tire guides 109a, 109b of the centering section 133. The force of the springs 153a, 153b allows the tire guides 109a, 109b to change the direction of the tires 119 and shift the chassis 139 towards center.

In an exemplary embodiment, linear actuators 179a, 179b, 179c, 179d adjust both middle power-driven section 147 and rear power-driven section 149, as shown in FIGS. 6A and 6C. Referring again to FIGS. 6A and 6C, the linear actuators 179a, 179b, 179c, 179d adjust the middle and rear power-driven sections 147, 149 in response to the adjustments of the centering section 133, as seen in FIGS. 5A and 5C. The middle tire guides 109c, 109d and rear tire guides 109e, 109f are initially spaced apart only enough to accommodate a 96 inch axle 121a, 121b. Therefore, if only the rearmost axles 121a, 121 b of a semi-trailer truck 107 being backed into the space 105 between the tire guides 109a, 109b, 109c, 109d, 109e, 109f are 102 inches, for example, then both the foremost tire guides 109a, 109b as well as the middle tire guides 109c, 109d are able to return to a position such that they are spaced apart enough to accommodate a 96 inch axle. This allows the tire guides 109a, 109b, 109c, 109d, 109e, 109f to direct accurately the tires 119 connected to a shorter axle 122a, 122b, 122c, such as a front axle associated with the tractor of a semi-trailer truck 107 and located towards the front of the semi-trailer truck 107.

Referring now to FIGS. 7, 5B, and 6B, in an example embodiment, once the actuators 179a, 179b, 179c, 179d are triggered they output a horizontal force on the slotted guide plates 151a-151p. The elongated slots 181a-181p are provided at an angle such that as each guide pin 183a-183p moves along the length of the associated elongated slot 181a-181p it simultaneously moves towards or away from the stationary guide angle 186a, 186b, 186c, 186d. The motion of the tire guides 109c, 109d, 109e, 109f is constrained by the slotted guide plates 151a-151p to be perpendicular to the surface of the tire guides 109c, 109d, 109e, 109f. FIGS. 5B and 6B depict the different location of the guide pin 183d as the guide pin 183d moves along the length of the associated elongated slot 181d.

Figure 8A:
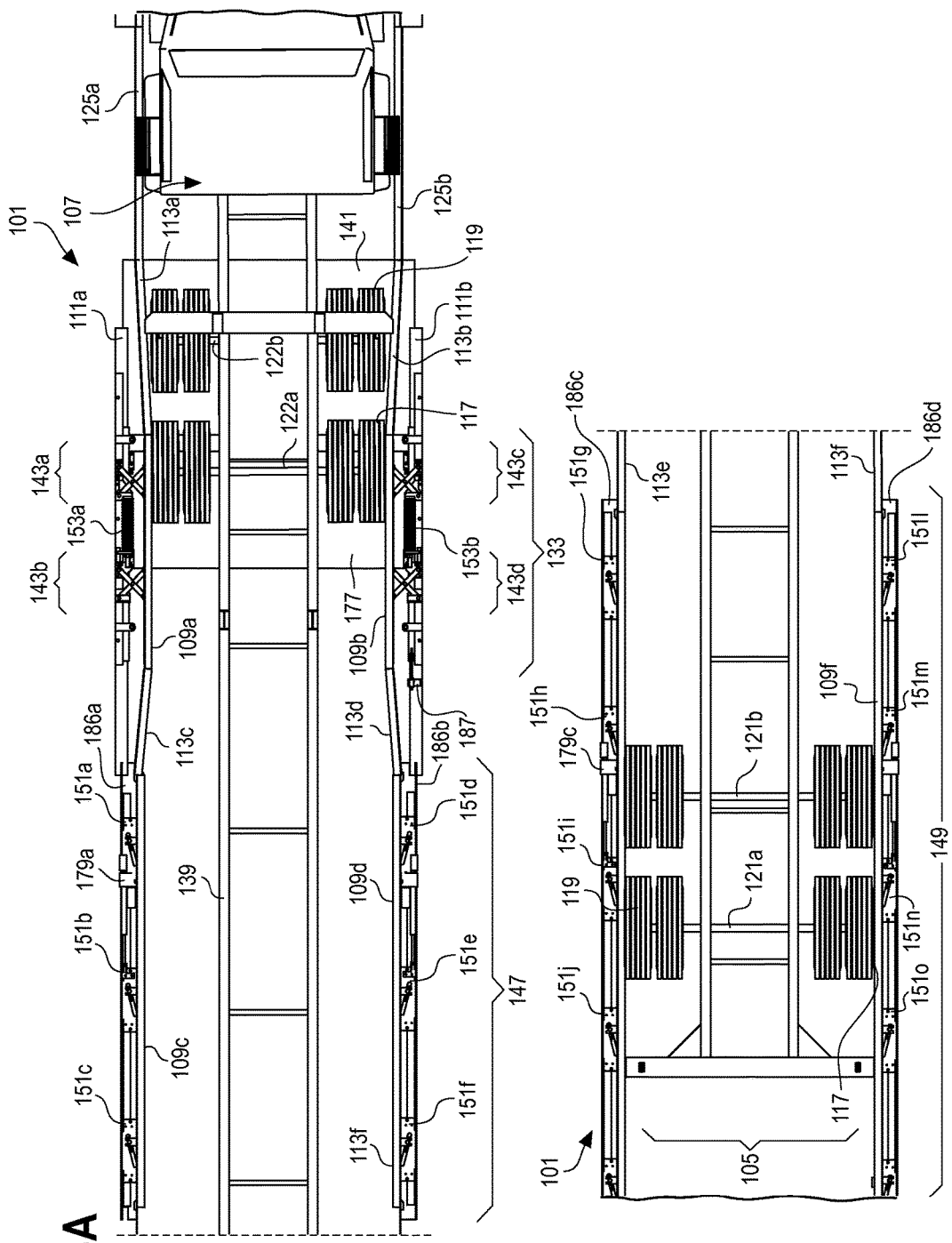
FIG. 8A is a plan view of a portion of the automatically aligning chassis guide system as the front two axles of the semi-trailer truck progress through the centering section of the system.
Figure 8B:
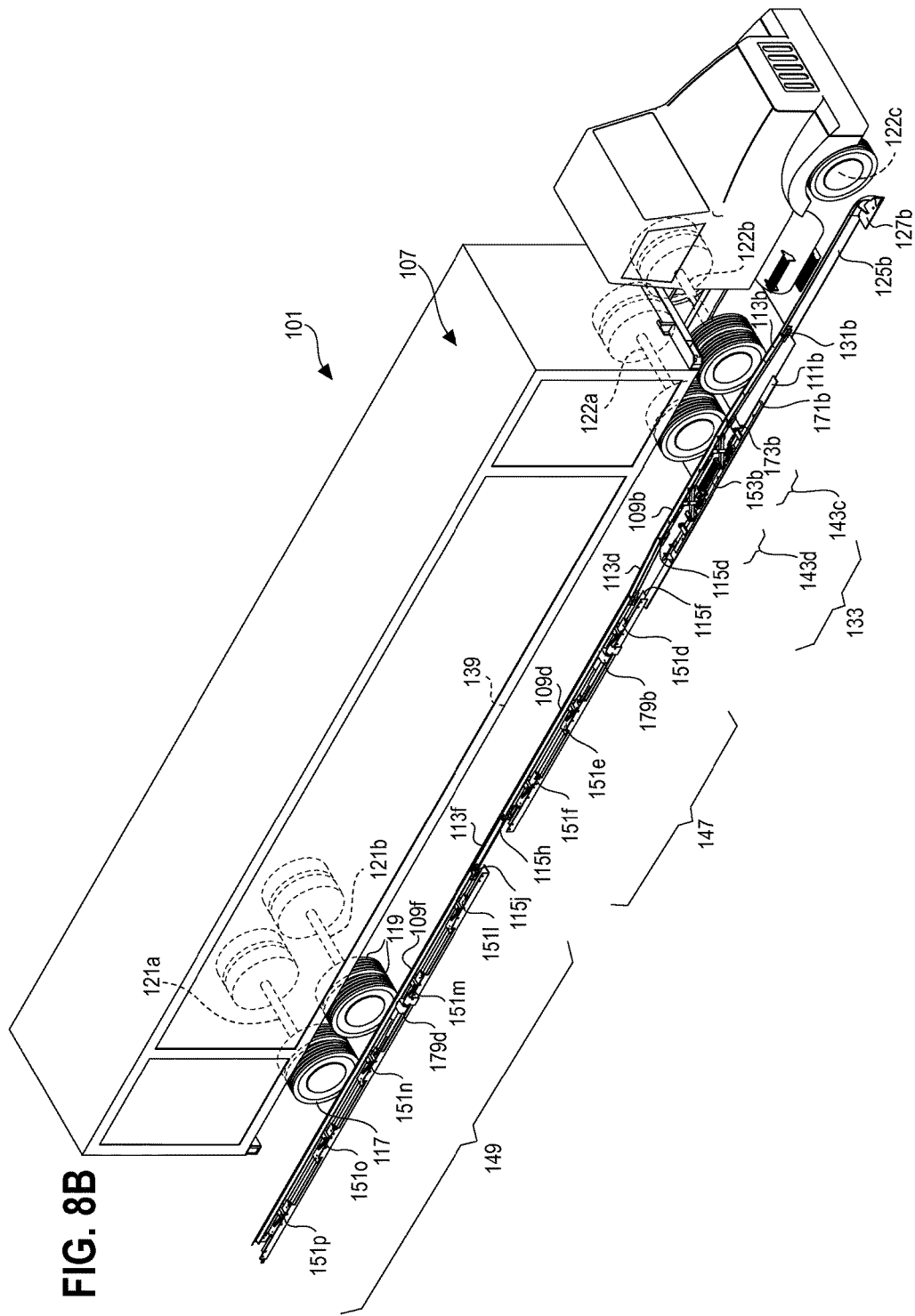
FIG. 8B is an isometric view of the portion of the automatically aligning chassis guide system of FIG. 8A.

The guide pins 183a-183p that are coupled to slotted guide plates 151a-151p are further fixed to the tire guides 109c, 109d, 109e, 109f. By way of example, reference will now be made to the operation of middle tire guide 109c and the slotted guide plate 151a, as shown in FIGS. 6A and 7. Enlarged examples of the slotted guide plate configuration are seen in FIGS. 5B and 6B. The slotted guide plate 151a is fastened to a guide angle 185a, which is constrained by stationary guide angle 186a to move parallel to the surface of the tire guide 109c. Likewise the slotted guide plate 151b is fastened to a guide angle 185b, which is constrained by stationary guide angle 186b to move parallel to the surface of the tire guide 109d. The movement of the guide angle 185a is produced by the actuator 179a coupled between the stationary guide angle 186a and the guide angle 185a. In an alternative embodiment, the actuator 179a may instead be coupled to one or more slotted guide plates 151b. The movement of the slotted guide plates 151a-c and guide angle 185a is developed therein by force of the actuator 179a pushing against the slotted guide plate 151b. When the guide angle 185a moves it causes all of the slotted guide plates 151a, 151b, 151c to move together. The guide pins 183a, 183b, and 183c, which are coupled to the tire guide 109c, cam inside the elongated slots 181a, 181b, and 181c to move the tire guide 109c towards and away from the stationary guide angle 186a. In such an example embodiment as shown in FIGS. 8A and 8B, activation of the actuators 179a, 179b, 179c, 179d may effect movement of the rear and middle tire guides 109c, 109d, 109e, 109f towards the stationary guide angles 186c, 186d in order to accommodate the larger axles 121a, 121b sensed at the centering section 133. This mechanism allows the middle and rear tire guides 109c, 109d, 109e, 109f to move outward, towards the stationary guide angles 186c, 186d, before the tires 119 reach the middle or rear power-driven sections 147, 149.

Figure 9A:
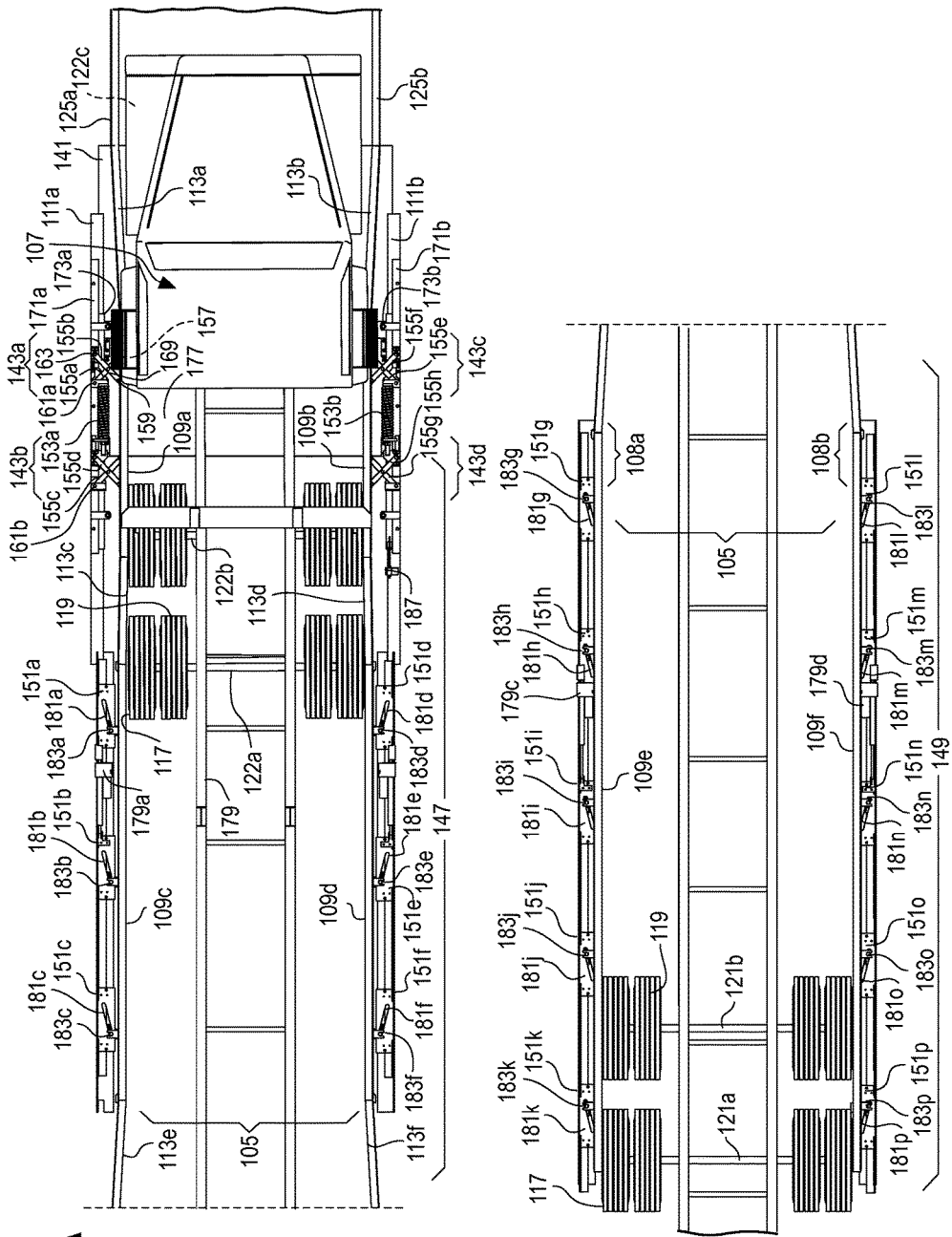
FIG. 9A is a plan view of a portion of the automatically aligning chassis guide system as the semi-trailer truck finishes progressing through the system.
Figure 9B:
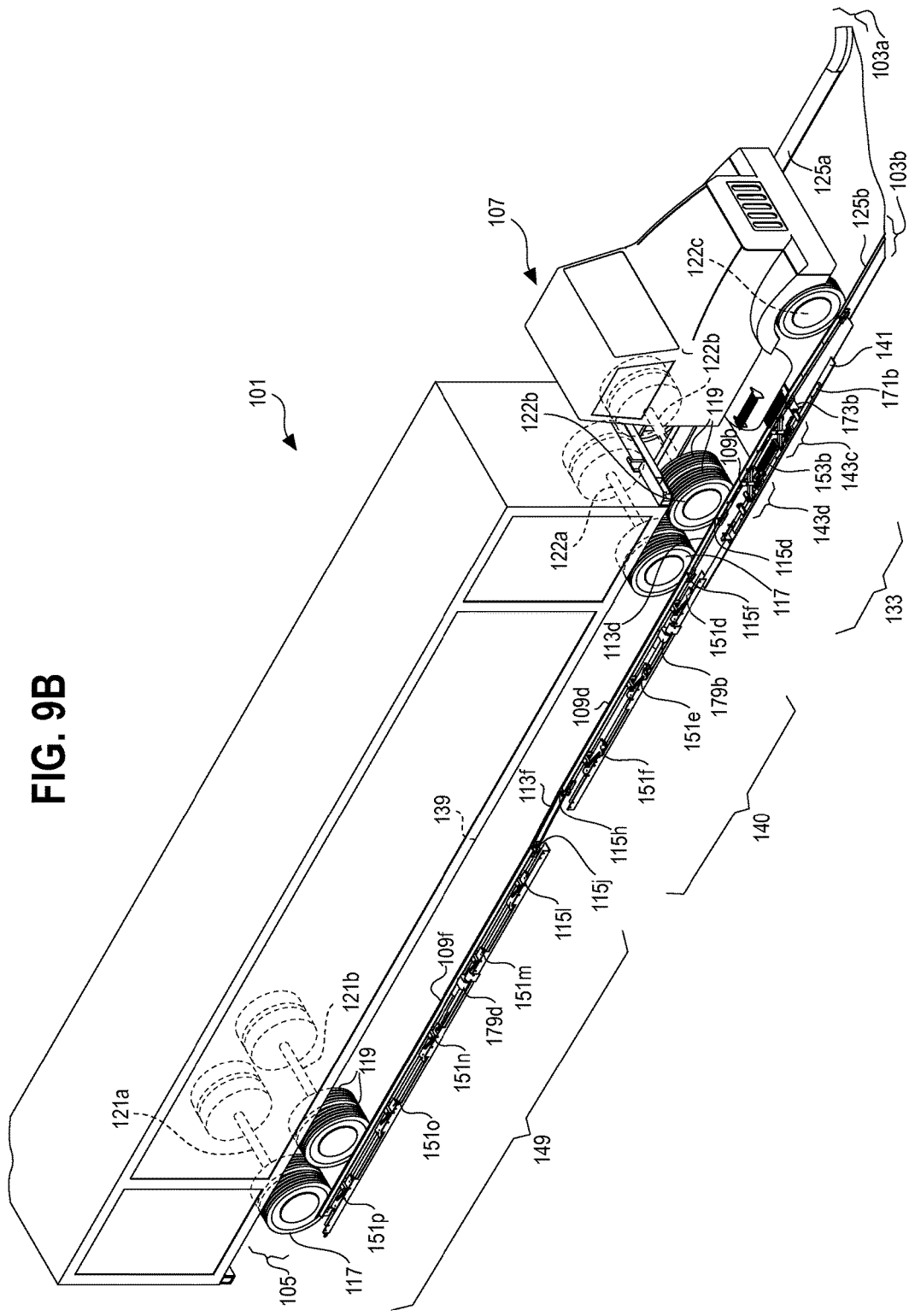
FIG. 9B is an isometric view of the portion of the automatically aligning chassis guide system of FIG. 9A.

In example embodiments, a sensor 187 that monitors the position of the foremost tire guides 109a, 109b determines the distance that the actuators 179a, 179b, 179c, 179d need to travel. As seen in FIGS. 6A and 6C, the middle power-driven section 147 initially adjusts to the width of the first trailer chassis axles 121a, 121b. Once the first trailer chassis axles 121a, 121b have passed, as depicted in FIGS. 9A and 9B, the middle power-driven section 147 adjusts to the width of the tractor axles 122a, 122b, 122c. The initial position of the middle power-driven section 147 is such that the tire guides 109c, 109d are spaced apart to accommodate a 96 inch width axle 121a, 121b, similar to the initial position of the centering section 133. The sensor 187 at the centering section 133 monitors the position of the moving platen 177. The moving platen 177 moves relative to the spacing of the tire guides 109a and 109b, as do the moving guide bars 173a, 173b. A command signal from the position sensor 187 is transmitted to control the actuators 179a, 179b, 179c, 179*d*. The linking guides 113*c*, 113*d* at the ends of the middle tire guides 109*c*, 109*d* allows the continuous guiding surface 108*a*, 108*b* of the tire guides 109*a*-109*f* to transition between the middle tire guides 109*c*, 109*d* and the foremost tire guides 109*a*, 109*b*, which may be adjusted different amounts within a range such that various axle widths may be accommodated.

In an example embodiment, the sensor 187 may be a linear voltage differential transducer (LVDT). An example LVDT sensor may have three solenoidal coils placed end-to-end around a tube. A cylindrical ferromagnetic core, attached to the object whose position is to be measured, slides along the axis of the tube. In an example embodiment, the cylindrical ferromagnetic core may be attached to one of the moving guide bars 173*a*, 173*b* while the tube and coils are mounted on one of the stationary guide mounting blocks 111*a*, 111*b*. Thereby the tube and coils may be held in a stationary position while the core moves back and forth through the tube and coils. The distance moved by the core is correlated to the movement of the moving guide bar 173*a*, 173*b* whereto the core is mounted. A number of components may be monitored to measure the amount of adjustment by the centering section 133, including, but not limited to, the scissor hinges 143*a*-143*d*, the moving guide bars 173*a*, 173*b*, the springs 153*a*, 153*b*, the moving platen 177, and the tire guides 109*a*, 109*b*. Some signal conditioning or filtering may be necessary to provide reliably readable measurement signals.

While a semi-trailer truck 107 is backing-in, initially the middle power-driven section 147 and the rear power-driven section 149 may move at the same time to adjust to the width of the first chassis axles 121*a*, 121*b*. In an alternate embodiment, after the first chassis axles 121*a*, 121*b* have passed by the centering section 133 the springs 153*a*, 153*b* force the tire guides 109*a*, 109*b* to return to the initial position spaced apart less than the width that would accommodate a 96 inch axle. (Return of the tire guides 109*a*, 109*b* to the initial position is depicted in FIGS. 6A and 6C.) The middle power-driven section 147 and rear power-driven section 149 remain set to accommodate the first chassis axles 121*a*, 121*b*. In alternative embodiments, further sensors may be provided that monitor the number of axles that have passed to track the progress of a semi-trailer truck 107 backing in to the automatically aligning chassis guide 101. Referring again to FIGS. 9A and 9B, when it is observed by the monitoring components that the chassis axles 121*a*, 121*b* have passed through the middle section 147, the middle section 147 may be further adjusted. In response to the measurements of the position sensor 187 monitoring the centering section 133, the middle power-driven section 147 may be moved to accommodate the width of the tractor axles 122*a*, 122*b*, 122*c*. As the tractor axles 122*a*, 122*b*, 122*c* reach the centering section 133 the trailer axles 121*a*, 121*b* have already passed the middle power-driven section 147 and are being guided by the rear power-driven section 149, allowing the middle power-driven section 147 to re-adjust according to the position measurements of the sensor 187 monitoring the centering section 133.

In alternative embodiments, further sensors may be included to track the number of axles backed through the automatically aligning chassis guide 101. Such sensors may be used to determine when a semi-trailer truck 107 has been completely backed in to a cargo bay spot and aligned. Additionally, an axle monitoring sensor may be used to determine when the semi-trailer truck 107 is backed-in completely and when a semi-trailer truck 107 is being removed from the automatically aligning chassis guide 101. This sensor information may be used for adjusting the actuators 179*a*, 179*b*, 179*c*, 179*d* of the middle and rear power-driven sections 147, 149 to allow the semi-trailer truck 107 to exit the automatically aligning chassis guide 101. One suitable sensor would be a photoelectric sensor. The photoelectric sensor, for example, may be used to count the number of tires 119 breaking a light beam of the sensor in order to track the number of axles passing a location along the automatically aligning chassis guide 101. Similarly, the photoelectric sensor may be used to sense when the first tires 119 begin to exit the automatically aligning chassis guide 101 and trigger the exiting adjustment of at least the middle section 147.

Other combinations of tire guides and sections may be advantageous for addressing different applications. The middle or rear power-driven sections 147, 149 may instead be driven by the force of the tires 119 on the tire guides 109*d*-109*f* similar to the centering section 133. Alternative embodiments may utilize scissor hinges along the entire length of the chassis guide mechanisms 103*a*, 103*b*. In still further embodiments, the power-driven sections may be used in conjunction with a system that measures the width of the axles 121*a*, 121*b*, 122*a*, 122*b*, 122*c* without a centering mechanism. An alternative embodiment includes sensors in the stationary front section 123 that may directly determine the axle width and provide for immediate transition to a power-driven section. Such an example embodiment may not use the force of the tires 119 on the tire guides 109*a*, 109*b* at all. Further embodiments contemplate alternatives to the actuators 179*a*, 179*b*, 179*c*, 179*d* such as hydraulic or air cylinders, power screws, gear motors, or the like to position the tire guides 109*c*, 109*d*, 109*e*, 109*f*. Still further embodiments may use a variety of suitable sensors for measuring the adjustment of the centering section 133 as well as for monitoring the number of axles received by the automatically aligning chassis guide 101. Other embodiments may include additional actuators for increasing the speed of the moving tire guides or to meet other parameters.

In a further example embodiment shown in FIG. 10, the automatically aligning chassis guide 101 may be built such that two chassis guide mechanisms 103*c*, 103*d* are back to back with chassis guide mechanisms 103*a*, 103*b* and form the automatically aligning chassis guide system 101 along the sides of two spaces 105 to be occupied by semi-trailer trucks 107. This design allows rows of spaces 105, 105*b*, 105*c* to be formed in the layout of a cargo bay where large scale transferring of shipments may take place.

The automatically adjusting chassis guide system 101 operates to center a chassis 139 of a vehicle, such as a semi-trailer truck, having axles of variable widths, such as the different width axles 121*a*, 121*b* and 122*a*, 122*b*, and 122*c* described in the above example embodiments. The system includes chassis guide mechanisms 103*a*, 103*b* having tire guides 109*a*-109*f* spaced apart from one another and mounted on a frame, such as a frame including stationary guide mounting blocks 111*a*, 111 *b* and stationary guide angles 186*a*, 186*b*, 186*c*, 186*d*. The first and second tire guides 109*a*-109*f* may be configured to opposely face one another, and the first and second tire guides 109*a*-109*f* may be configured to be substantially parallel. A plurality of tire guide sections 133, 147, 149 may be joined to form each of the first and second tire guides 109*a*-109*f* of the chassis guide mechanisms 103*a*, 103*b*. Each tire guide 109*a*-109*f* may be adjustable within a range such that a distance between opposing tire guides 109*a*-109*f* may be adjusted. The tire guide sections 133, 147, 149 are adjusted based on the position of tires 119 mounted on axles 121*a*, 121*b*, 122*a*, 122*b*, 122*c* associated with the chassis 139. This feature is advantageous because the configuration of the tire guides 109*a*-109*f* allows for the accommodation of axles 121*a*, 121*b*, 122*a*, 122*b*, 122*c* having varying widths while still providing guidance and centering to the chassis 139 as it enters the automatically aligning chassis guide system 101.

The first tire guides 109a, 109b of the first and second chassis guide mechanisms 103a, 103b are configured such that at least one spring 153a, 153b adjusts the first tire guide section 133. The adjustment of the first tire guides 109a, 109b may be observed by a sensor 187. Other tire guide sections 147, 149 may be configured such that at least one actuator 153a, 153b adjusts the tire guides 109c-109f of the other tire guide sections 147, 149 in response to the position measurements of the sensor 187. This allows the other tire guide sections 147, 149 to continue guiding the semi-trailer truck 107 as it backs in to the automatically aligning chassis guide system 101. Finally, in this example, the tire guides 109a-109f that wider axles 121a, 121b have passed may return to a starting, initial position such that the narrower axles 122a-122c of the tractor may be guided and centered as well even though the narrower axles 122a-122c may have entered the automatically adjusting chassis guide system 101 after the wider axles 121a, 121b. Thus, the entire semi-trailer truck may be guided and centered as it enters the automatically adjusting chassis guide system 101.

The embodiment(s) detailed above may be combined, in full or in part, with any alternative embodiment(s) described.

INDUSTRIAL APPLICABILITY

As seen, drivers are capable of backing trucks in to locations, such as cargo bays, for the purposes of loading or unloading. However, efficiencies may be realized if the chassis of a semi-trailer truck is positioned with a degree of accuracy. The present embodiments permit automatic alignment of the chassis of a semi-trailer truck entering a cargo bay without introducing significant complexity and cost.

The automatically adjusting chassis guide system is configured to accommodate semi-trailer trucks having a variety of axle widths. Further, the embodiments described herein not only accommodate semi-trailer trucks having axles with a variety of widths, but also provide for alignment of semi-trailer trucks despite variations in axle width. Thus, the automatically adjusting chassis guide system is useful for increasing the efficiency of shipment transfers to and from a semi-trailer truck while, likewise, being versatile enough to accommodate trucks having a variety of axle widths.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A system for positioning a vehicle chassis within a cargo bay wherein tires are mounted on an axle associated with the chassis, the system comprising:
    first and second tire guides spaced apart from one another wherein the first and second tire guides are configured to opposedly face one another; and
    a plurality of tire guide sections joined to form each of the first and second tire guides, each tire guide section being adjustable within a range such that a distance between opposing tire guide sections may be adjusted, wherein the tire guide sections are automatically adjusted based on the position and movement of the tires mounted on the axle associated with the chassis, and wherein the tire guide sections apply a force to the tires to align the chassis within the cargo bay as the chassis is moved into the cargo bay.

2. The system of claim 1, further comprising:
    a frame to which the first and second tire guides are connected, wherein the frame provides a configuration of the first and second tire guides, wherein the first and second tire guides are spaced apart.

3. The system of claim 1, wherein the tire guide sections are further adjusted based on the position of additional tires mounted on at least one additional axle associated with the chassis.

4. A system for positioning a vehicle chassis wherein tires are mounted on an axel associated with the chassis, the system comprising:
    first and second tire guides spaced apart from one another wherein the first and second tire guides are configured to opposedly face one another;
    a plurality of tire guide sections joined to form each of the first and second tire guides, each tire guide section being adjustable within a range such that a distance between opposing tire guide sections may be adjusted, wherein the tire guide sections are adjusted based on the position of the tires mounted on the axle associated with the chassis;
    first tire guide sections of the first and second tire guides;
    other tire guide sections of the first and second tire guides;
    at least one spring, wherein the first tire guide sections are adjusted by the at least one spring; and
    at least one actuator, wherein the other tire guide sections are adjusted by the at least one actuator.

5. The system of claim 4, wherein the first tire guide sections are adjusted in response to contact between the first tire guide sections and the tires mounted on the axle associated with the chassis; and
    wherein the other tire guide sections are adjusted based on adjustment of the first tire guide sections.

6. The system of claim 5, further comprising:
    at least one scissor joint respectively coupled to the first tire guide sections of the first and second tire guides, wherein the scissor joint provides adjustment of the first tire guide sections such that the first tire guide sections are configured to move towards and away from one another.

7. The system of claim 6, further comprising:
    at least one cam joint respectively coupled to the other tire guide sections of the first and second tire guides, wherein the cam joint provides adjustment of the other tire guide sections such that the other tire guide sections are configured to move towards and away from one another.

8. The system of claim 5, further comprising:
the at least one spring, wherein the first tire guide sections are adjusted again in response to the tires mounted on the axle moving past the first tire guide sections.

9. The system of claim 5, further comprising:
at least one position sensor, wherein the at least one position sensor measures position information of the first tire guide sections in response to the first tire guide sections being adjusted, and
wherein the other tire guide sections are adjusted based on the position information.

10. The system of claim 9, further comprising:
at least one communication channel, wherein the at least one communication channel communicates position information between the position sensor and the at least one actuator; and
wherein the at least one actuator adjusts the other tire guide sections based on the measured position information.

11. A chassis guide system for centering a chassis of a vehicle having axles of variable widths in a cargo bay, the system comprising:
first and second tire guides spaced apart from one another and mounted on a frame,
wherein the first and second tire guides are configured to opposedly face one another, and wherein the first and second tire guides are substantially parallel;
a plurality of tire guide sections joined to form each of the first and second tire guides, each tire guide section being adjustable within a range such that a distance between opposing tire guide sections may be adjusted, and
wherein the tire guide sections are automatically adjusted based on the position and movement of tires mounted on the axles associated with the chassis, and wherein the tire guide sections apply a force to the tires to align the chassis within the cargo bay as the chassis is moved into the cargo bay.

12. A chassis guide system for centering a chassis of a vehicle having axles of variable widths, the system comprising:
first and second tire guides spaced apart from one another and mounted on a frame,
wherein the first and second tire guides are configured to opposedly face one another, and wherein the first and second tire guides are substantially parallel;
a plurality of tire guide sections joined to form each of the first and second tire guides, each tire guide section being adjustable within a range such that a distance between opposing tire guide sections may be adjusted,
wherein the tire guide sections are adjusted based on the position of tires mounted on axles associated with the chassis;
first tire guide sections of the first and second tire guides;
other tire guide sections of the first and second tire guides;
at least one spring, wherein the first tire guide sections are adjusted by the at least one spring, and wherein the adjustment of the first tire guide sections centers the chassis; and
at least one actuator, wherein the other tire guide sections are adjusted by the at least one actuator.

13. The chassis guide system of claim 12, wherein the first tire guide sections are adjusted in response to contact between the first tire guide sections and the tires mounted on the axle associated with the chassis; and
wherein the other tire guides sections are adjusted based on adjustment of the first tire guide sections.

14. The chassis guide system of claim 13, wherein the tire guides are adjusted in response to contact between the first tire guide sections and the tires mounted on the axle associated with the chassis, and
wherein the tire guides are adjusted in response to the discontinuation of contact between the first tire guide sections and the tires mounted on the axle associated with the chassis, and
wherein the tire guides are adjusted in response to contact between the first tire guide sections and additional tries mounted on an additional axle associated with the chassis.

15. The chassis guide system of claim 13, wherein the tire guides are adjusted in response to contact between the first tire guide sections and the tires mounted on the axle associated with the chassis,
wherein the contact between the first tire guide sections and the tires mounted on the axle associated with the chassis is based on the width of the axle,
wherein the tire guide sections are configured to accommodate the axle having a width within a range of standard axle widths,
wherein standard axle widths include a 96 inch width and a 102 inch width, and
wherein the tire guides are configured such that the tire guides are adjusted to accommodate one or more axles having different widths, and
wherein the tire guides are configured such that the tire guides are adjusted to accommodate vehicles with one or more axles having different widths.

16. A system for positioning a vehicle chassis wherein tires are mounted on an axle associated with the chassis within a cargo bay, the system comprising:
a tire guide having a plurality of tire guide sections joined to form the tire guide, wherein each tire guide section is adjustable within a range,
wherein the tire guide sections are automatically adjusted based on the position and movement of the tires mounted on the axle associated with the chassis and wherein the tire guide sections apply a force to the tires to align the chassis within the cargo bay as the chassis is moved into the cargo bay; and
a frame, wherein the plurality of tire guide sections are mounted to the frame, and
wherein the plurality of tire guide sections are adjusted to move laterally in relation to the frame.

17. A system for positioning a vehicle chassis wherein tires are mounted on an axle associated with the chassis, the system comprising:
a tire guide having a plurality of tire guide sections joined to form the tire guide, wherein each tire guide section is adjustable within a range,
wherein the tire guide sections are adjusted based on the position of the tires mounted on the axle associated with the chassis; and
a frame, wherein the plurality of tire guide sections are mounted to the frame, and
wherein the plurality of tire guide sections are adjusted to move laterally in relation to the frame;
a first tire guide section of the tire guide;
other tire guide sections of the tire guide;
at least one spring, wherein the first tire guide is adjusted by the at least one spring; and
at least one actuator, wherein the other tire guide sections are adjusted by the at least one actuator.

18. The system of claim 17, wherein the first tire guide section is adjusted in response to contact between the first tire guide section and at least one tire mounted on the axle associated with the chassis; and wherein the other tire guide sections are adjusted based on the adjustment of the first tire guide section.

19. The system of claim 18, further comprising:

at least one scissor joint respectively coupled to the first tire guide section, wherein the scissor joint provides adjustment of the first tire guide section such that the first tire guide section is configured to move towards and away from the frame.

20. The system of claim 19, further comprising:

at least one cam joint respectively coupled to the other tire guide sections, wherein the cam joint provides adjustment of the other tire guide sections such that the other tire guide sections are configured to move towards and away from the frame.

21. The system of claim 20, further comprising:

a second tire guide configured to opposedly face the first tire guide, wherein the second tire guide is further configured to be substantially parallel to the first tire guide.

\* \* \* \* \*